US009348542B2

(12) United States Patent
Yoshida et al.

(10) Patent No.: US 9,348,542 B2
(45) Date of Patent: May 24, 2016

(54) DISPLAY PROCESSING APPARATUS, DISPLAY PROCESSING METHOD, AND COMPUTER-READABLE RECORDING MEDIUM

(71) Applicants: Hiroyuki Yoshida, Tokyo (JP); Masahiko Yoshimura, Tokyo (JP); Risa Tsutsui, Tokyo (JP); Rieko Ishihara, Tokyo (JP); Yuki Kawata, Tokyo (JP)

(72) Inventors: Hiroyuki Yoshida, Tokyo (JP); Masahiko Yoshimura, Tokyo (JP); Risa Tsutsui, Tokyo (JP); Rieko Ishihara, Tokyo (JP); Yuki Kawata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/729,841

(22) Filed: Jun. 3, 2015

(65) Prior Publication Data

US 2015/0355867 A1    Dec. 10, 2015

(30) Foreign Application Priority Data

Jun. 10, 2014 (JP) .................................. 2014-119817

(51) Int. Cl.
| | |
|---|---|
| *G06T 19/00* | (2011.01) |
| *G06F 3/12* | (2006.01) |
| *G06T 15/04* | (2011.01) |
| *G06F 3/041* | (2006.01) |
| *G06F 3/14* | (2006.01) |
| *G09G 3/36* | (2006.01) |
| *H04N 13/02* | (2006.01) |
| *H04N 1/00* | (2006.01) |

(52) U.S. Cl.
CPC .............. *G06F 3/1208* (2013.01); *G06F 3/041* (2013.01); *G06F 3/1256* (2013.01); *G06F 3/14* (2013.01); *G06T 15/04* (2013.01); *G09G 3/36* (2013.01); *H04N 1/0044* (2013.01); *H04N 13/0275* (2013.01); *G06F 2203/04101* (2013.01)

(58) Field of Classification Search
USPC ........... 358/1.15; 348/131; 345/419, 426, 664
See application file for complete search history.

(56) References Cited

U.S. PATENT DOCUMENTS

| | | | | |
|---|---|---|---|---|
| 2004/0061676 | A1* | 4/2004 | Sitrick ................... | G03B 21/26 345/90 |
| 2012/0137320 | A1* | 5/2012 | Mugulavalli ......... | H04N 21/222 725/25 |
| 2012/0242653 | A1* | 9/2012 | Wu ..................... | H04N 13/0402 345/419 |

FOREIGN PATENT DOCUMENTS

| | | |
|---|---|---|
| JP | 2012-044421 | 3/2012 |
| JP | 4960840 | 3/2012 |
| JP | 2013-196616 | 9/2013 |
| JP | 2014-095965 | 5/2014 |
| JP | 2014-096648 | 5/2014 |

* cited by examiner

*Primary Examiner* — Jerome Grant, II
(74) *Attorney, Agent, or Firm* — Cooper & Dunham LLP

(57) ABSTRACT

A display processing apparatus includes a first acquisition unit for acquiring light source information including a first relative position of a light source with respect to a display unit, a detection unit for detecting posture information of the display unit, a second acquisition unit for acquiring the posture information, a third acquisition unit for acquiring document data, a calculation unit for calculating a second relative position of the light source with respect to the display unit, a generation unit for generating a document display surface where a state in which a document surface displaying the document data is disposed in a virtual three-dimensional space and also the light source is disposed at the second relative position with respect to the document surface is converted to a two-dimensional image, and a display control unit for executing control to display a preview image on the display unit.

11 Claims, 19 Drawing Sheets

FIG.4

| No. | NAME OF LIGHT SOURCE POSITION | FIRST RELATIVE POSITION | | |
|---|---|---|---|---|
| | | RIGHT [cm] | UP [cm] | FRONT [cm] |
| 1 | FRONT LEFT OF OFFICE CEILING | -100 | 200 | 100 |
| 2 | FRONT OF OFFICE CEILING | 0 | 200 | 100 |
| 3 | FRONT RIGHT OF CEILING | 100 | 200 | 100 |
| 4 | LEFT OF CEILING | -100 | 200 | 0 |
| 5 | DIRECTLY ABOVE CEILING | 0 | 200 | 0 |
| 6 | RIGHT OF CEILING | 100 | 200 | 0 |
| 7 | REAR LEFT OF CEILING | -100 | 200 | -100 |
| 8 | REAR OF CEILING | 0 | 200 | -100 |
| 9 | REAR RIGHT OF CEILING | 100 | 200 | -100 |
| : | : etc. | | | |
| 0 | DESIGNATE VALUES | | | |

FIG.5

| No. | LIGHT SOURCE TYPE |
|---|---|
| 1 | FLUORESCENT LIGHT |
| 2 | LIGHT BULB |
| 3 | LED |
| 4 | CANDLE |
| : | : etc. |

FIG.6

| No. | PAPER TYPE |
|---|---|
| 1 | PLAIN PAPER |
| 2 | COATED PAPER |
| 3 | MATT COATED PAPER |
| 4 | FINE PAPER |
| : | : etc. |

FIG.7

| No. | NAME OF IMAGE DATA |
|---|---|
| 1 | Sample1.pdf |
| 2 | Sample2.pdf |
| : | : etc. |

DISPLAY PROCESSING APPARATUS, DISPLAY PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-119817 filed in Japan on Jun. 10, 2014.

BACKGROUND OF THE INVENTION

1. Field of the Invention

The present invention relates to a display processing apparatus, a display processing method, and a computer-readable recording medium.

2. Description of the Related Art

There is a known device to display a preview image in which a printing result is estimated before printing (refer to Patent Literature 1 and Patent Literature 2, for example).

Patent Literature 1 discloses a technology in which a blur image obtained by processing illumination image data is generated by using deflection reflection characteristics of a recording medium, and an image combining the generated blur image with a proof target image is displayed as a preview image. Patent Literature 2 discloses a technology in which a preview image including a color of a printing result and texture of a recording medium is generated.

However, in the related arts, a preview image in accordance with a posture, such as inclination or an angle of a display unit, cannot be provided.

SUMMARY OF THE INVENTION

It is an object of the present invention to at least partially solve the problems in the conventional technology.

There is provided a display processing apparatus that includes a first acquisition unit configured to acquire light source information including a first relative position of a light source with respect to a display unit, a detection unit configured to detect posture information of the display unit, a second acquisition unit configured to acquire the posture information of the display unit from the detection unit, a third acquisition unit configured to acquire document data, a calculation unit configured to calculate a second relative position of the light source with respect to the display unit having posture specified by second posture information by using the first relative position, first posture information previously acquired as the posture information, and the second posture information acquired this time as the posture information, a generation unit configured to generate a document display surface where a state in which a document surface displaying the document data is disposed in a virtual three-dimensional space and also the light source is disposed at the second relative position with respect to the document surface is converted to a two-dimensional image visually confirmed from a viewpoint position located in a normal line of the document surface, and a display control unit configured to execute control to display a superimposed image on the display unit as a preview image estimating a printing result of the document data, the superimposed image being obtained by superimposing a background image of observation environment in a real space and the document display surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an exemplary input screen for a first relative position;

FIG. 5 is a diagram illustrating an exemplary selection screen for a light source type;

FIG. 6 is a diagram illustrating an exemplary selection screen for a paper type;

FIG. 7 is a diagram illustrating an exemplary selection screen for document data;

DETAILED DESCRIPTION OF THE PREFERRED EMBODIMENTS

Embodiments of a display processing apparatus, a display processing method, and a program will be described below in detail with reference to the accompanying drawings.

First Embodiment

Figure 1:
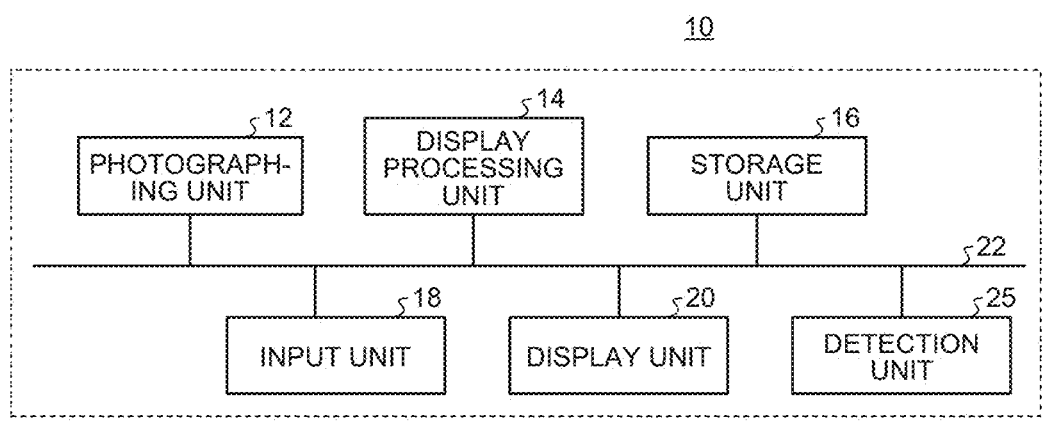
FIG. 1 is a schematic diagram illustrating a display processing apparatus according to an embodiment.

FIG. 1 is a schematic diagram illustrating a display processing apparatus 10 according to a present embodiment.

The display processing apparatus 10 is a device to display a preview image on a display unit 20.

The display processing apparatus 10 includes a photographing unit 12, a display processing unit 14, a storage unit 16, an input unit 18, the display unit 20, and a detection unit 25. The photographing unit 12, display processing unit 14, storage unit 16, input unit 18, display unit 20, and detection unit 25 are electrically connected via a bus 22.

Note that display processing apparatus 10 is needed to include at least the display processing unit 14, and at least one of the photographing unit 12, storage unit 16, input unit 18, display unit 20, and detection unit 25 may be configured as a separate body.

Further, the display processing apparatus 10 may be a portable mobile terminal or may be a fixed-type terminal as well. In the present embodiment, a case where the display processing apparatus 10 is the portable mobile terminal integrally including the photographing unit 12, display processing unit 14, storage unit 16, input unit 18, display unit 20, and detection unit 25 will be described as an example.

The photographing unit 12 photographs an observation environment in a real space where a preview image is displayed. The observation environment is an environment when a user visually confirms (observes) an image displayed on the display unit 20. Also, the observation environment may be an environment to observe a recording medium on which document data is printed. The photographing unit 12 obtains, by photographing, a background image as a photographed image of the observation environment in the real space. The background image may be a still image or may be a moving image. Examples of the observation environment in the real space where a preview image is displayed may be an office, an exhibition hall, a station yard, a train platform, inside various kinds of building, and so on. The photographing unit 12 is a known photographing device.

The display unit 20 displays various kinds of images. The display unit 20 is a known display device such as a liquid crystal display (LCD) and a projector to project an image.

In the present embodiment, a later-described preview image is displayed on the display unit 20.

Further, in the present embodiment, a description will be given for a case where the display unit 20 and the photographing unit 12 are disposed in a housing (not illustrated) of the display processing apparatus 10 such that a display surface of the display unit 20 and a photographing direction of the photographing unit 12 are mutually directed in opposite directions. Therefore, for example, in the case where a photographed image photographed by the photographing unit 12 is displayed on the display unit 20 while a position of the display processing apparatus 10 is fixed, the photographed image displayed on the display unit 20 and landscape in the real space located at the background of the display unit 20 (opposite side of a display surface of the display unit 20) become the same.

The input unit 18 receives various kinds of operation from a user. The input unit 18 may be, for example, a mouse, voice recognition by a microphone, a button, a remote control, a keyboard, and so on.

Note that the input unit 18 and the display unit 20 may also be integrally formed as a touch panel.

The storage unit 16 is a storage medium such as a memory and a hard disk drive (HDD), and stores various kinds of programs to execute respective processing described later, and various kinds of data.

The detection unit 25 detects posture information indicating posture of the display unit 20 in the real space. In the present embodiment, the detection unit 25 and the display unit 20 are integrally disposed at the display processing apparatus 10. Therefore, the detection unit 25 may also detect the posture of the display unit 20 by detecting the posture information of the display processing apparatus 10.

The posture information is the information to indicate posture of the display unit 20 in the real space. More specifically, the posture information includes inclination of the display unit 20 and a facing direction of the display surface of the display unit 20. In the present embodiment, the posture information indicates the inclination and facing direction of the display surface of the display unit 20 in a first coordinate system when an X-axis corresponds to an east-west direction, a Y-axis corresponds to a vertical direction, and a Z-axis corresponds to a north-south direction. In the first coordinate system, a right-and-left direction of the display surface of the display unit 20 is defined as the X-axis, an up-and-down direction thereof is defined as the Y-axis, and a direction vertical to the display surface is defined as the Z-axis. Note that an XY plane in the first coordinate system corresponds to the display surface. Further, an origin (zero point) of the first coordinate system is a center of the display surface.

Figure 2A:
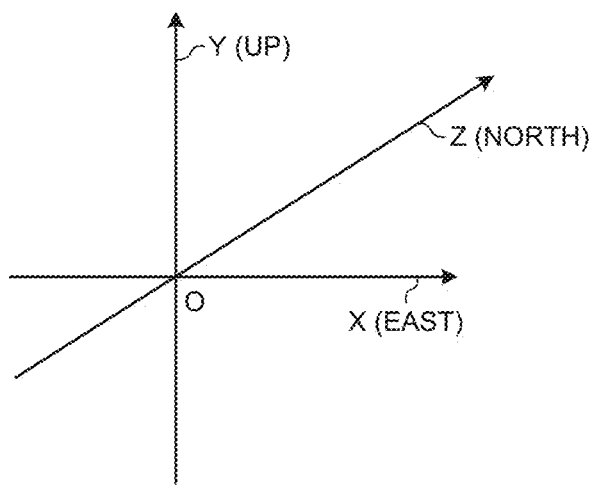
FIGS. 2A and 2B are explanatory diagrams illustrating coordinate axes.
Figure 2B:
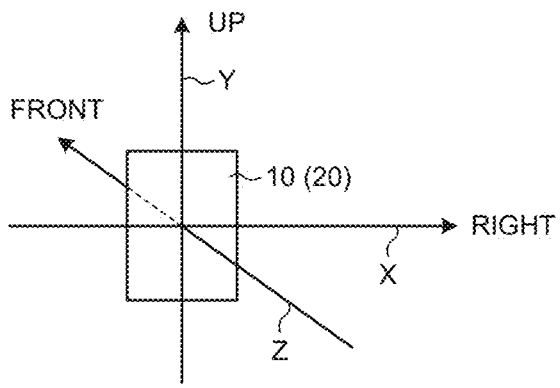

FIGS. 2A and 2B are explanatory diagrams illustrating the coordinate axes. FIG. 2A is a three-dimensional coordinate (defined as a second coordinate system) in the real space, and is a world coordinate. FIG. 2B is the explanatory diagram illustrating the first coordinate system based on the display surface of the display unit 20.

In the present embodiment, the posture information is based on a state in which the X-axis of the first coordinate system (refer to FIG. 2B) corresponds to the east-west direction of the second coordinate system (refer to FIG. 2A), the Y-axis of the first coordinate system (refer to FIG. 2B) corresponds to the vertical direction of the second coordinate system (refer to Y-axis direction in FIG. 2A), and the Z-axis of the first coordinate system (refer to FIG. 2B) corresponds to the north-south direction of the second coordinate system (refer to Z-axis direction in FIG. 2A). Further, in the present embodiment, the posture information indicates the inclination and facing direction (angle) of the display surface of the display unit 20 in the first coordinate system when the X-axis corresponds to the east-west direction, the Y-axis corresponds to the vertical direction, and the Z-axis corresponds to the north-south direction. In the first coordinate, the right-and-left direction of the display surface of the display unit 20 is defined as the X-axis, the up-and-down direction thereof is defined as the Y-axis, and the direction vertical to the display surface is defined as the Z-axis. Note that the description will be given in the present embodiment under the condition that a length unit used in the first coordinate system is cm in all of the X-axis, Y-axis, and Z-axis.

For the detection unit 25, for example, a known detector capable of detecting inclination and a direction (angle) is used. For instance, the detection unit 25 may be a gyro sensor (triaxial accelerometer), an electronic compass, a gravity accelerometer, and so on.

The display processing unit 14 is a computer configured to include a central processing unit (CPU), a read only memory (ROM), a random access memory (RAM), and so on. Note that the display processing unit 14 may also be a general-purpose circuit or the like other than the CPU. The display processing unit 14 controls respective units of the device disposed at the display processing apparatus 10.

The display processing unit 14 controls displaying a preview image of document data on the display unit 20. In the present embodiment, the preview image is a superimposed image obtained by superimposing, on the background image, the display surface on a document surface where the document data is displayed. The above-described display processing is achieved by a 3D engine such as an open graphics library (OpenGL).

The background image is a photographed image of the observation environment in the real space where a preview image is displayed. In the present embodiment, the display surface to be superimposed on the background image is a document display surface. The document display surface is an image in which a light source image (described later in detail) is reflected on the document surface where the document data is displayed.

In the present embodiment, a description will be given for a case where the preview image is an image in which the background image is disposed in a virtual space and a three-dimensional model obtained by disposing the document display surface in the three-dimensional space on the background image is projected to a two-dimensional surface.

Note that the preview image may also be a two-dimensional model obtained by disposing the background image and the document display surface in a two-dimensional space.

Further, in the present embodiment, the case where the preview image is the superimposed image obtained by disposing the document display surface on the background image will be described. However, the preview image is only needed to be an image obtained by disposing the document display surface on the background image, and further may also be an image including a different display surface.

Examples of the different display surface may include a display surface on which a transparent image formed by using colorless developer is displayed, a display surface on which a surface effect image is displayed; and so on, but not limited thereto. In the surface effect image, a surface effect provided to a paper is defined by using the colorless developer.

In the case where the preview image includes a plurality of the display surfaces, the preview image may be an image in which the plurality of display surfaces is disposed at different positions in the Z-axis direction.

Figure 3:
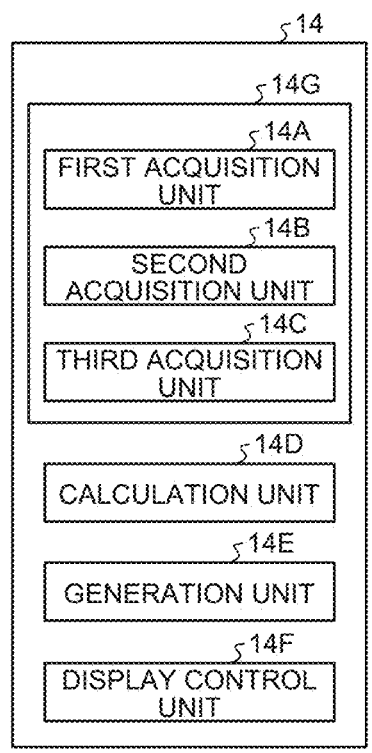
FIG. 3 is a block diagram illustrating a functional configuration of a display processing unit.

FIG. 3 is a block diagram illustrating a functional configuration of the display processing unit 14. The display processing unit 14 includes an acquisition unit 14G, a calculation unit 14D, a generation unit 14E, and a display control unit 14F. The acquisition unit 14G includes a first acquisition unit 14A, a second acquisition unit 14B, and a third acquisition unit 14C.

The first acquisition unit 14A, second acquisition unit 14B, third acquisition unit 14C, calculation unit 14D, generation unit 14E, and display control unit 14F may be partly or entirely implemented by causing, for example, a processor such as CPU to execute a program, more specifically, by software, or implemented by hardware such as an integrated circuit (IC), or implemented by combining the software with the hardware.

The first acquisition unit 14A acquires light source information. A user inputs the light source information by operating the input unit 18. The first acquisition unit 14A acquires the light source information from the input unit 18.

The light source information includes a first relative position of a light source with respect to the display unit 20. The light source information includes the first relative position and a light source type of the light source in the real space.

In the present embodiment, a case where the light source information includes the first relative position and light source type will be described.

The first relative position is a relative position of the light source with respect to the display unit 20, and also the relative position input by the user's operation at the input unit 18. In other words, the first relative position is the relative position of the light source with respect to the display unit 20 when the light source information is input by the user. More specifically, the first relative position indicates the relative position of the light source in the three-dimensional space of the first coordinate system in which the right-and-left direction of the display surface of the display unit 20 is defined as the X-axis, the up-and-down direction thereof is defined as the Y-axis, and the direction vertical to the display surface is defined as the Z-axis, and the center of the display surface of the display unit 20 is set as the origin.

The user inputs the first relative position via an input screen displayed on the display unit 20, for example. FIG. 4 is a diagram illustrating an exemplary input screen for the first relative position. In the example illustrated in FIG. 4, the first relative position is represented by a position in a "right" direction (positive direction of the X-axis), a position in an "upward" direction (positive direction of the Y-axis), and a position in a "front" direction (positive direction of the Z-axis) in the three-dimensional space of the first coordinate system in which the center of the display surface of the display unit 20 is set as the origin. Note that, in the present embodiment, a "frontward direction" and "front side" indicate a downstream side of a visual line (opposite side of the display surface on the display unit 20) when viewed from a viewpoint P in a normal line (Z-axis direction) with respect to the display surface at the display unit 20. Further, a "rearward direction" and "rear side" indicate a side of the viewpoint P (display surface side of the display unit 20) in the normal line (Z-axis direction) with respect to the display surface at the display unit 20.

For example, a selection button (not illustrated) for a "light source position" displayed on the display unit 20 is selected in accordance with an operation command by the user at the input unit 18, thereby displaying the input screen for inputting the first relative position (refer to FIG. 4). In the example illustrated in FIG. 4, the input screen is displayed, in which names of the light source position preliminarily registered are listed, being correlated to the first relative positions and identification information (No.). A desired first relative position is selected in accordance with an addition operational command by the user at the input unit 18, thereby inputting the first relative position to the display processing unit 14. Meanwhile, in the case where the desired relative position is not displayed on the input screen illustrated in FIG. 4, the user may select an area indicating "designated values" to set a new value, and may input a new name of the light source position and a first relative position.

The light source type indicates a type of the light source. For example, the light source type may be a fluorescent light, a light bulb, a light emitting diode (LED), a candle, and a spot light, and so on.

The user inputs the light source type via a selection screen displayed on the display unit 20, for example. FIG. 5 is a diagram illustrating an exemplary selection screen for the light source type. For example, a selection button (not illustrated) of the "light source type" displayed on the display unit 20 is selected in accordance with the operational command by the user at the input unit 18, thereby displaying the selection screen to select the light source type (refer to FIG. 5). In the example illustrated in FIG. 5, "fluorescent light", "light bulb", "LED", and "candle" are displayed as the light source types in a selectable manner. A selected light source type is input to the display processing unit 14 by selecting a desired light source type in accordance with the operational command by the user at the input unit 18.

Additionally, the first acquisition unit 14A further acquires, from the input unit 18, a paper type indicating paper quality of a recording medium for an image forming object.

The paper type is preliminarily set for each different type to such an extent that the user can confirm a difference of paper quality at the time of visually confirming the recording medium on which the image is formed. In the present embodiment, a description will be given by exemplifying a plain paper, a coated paper, a matt coated paper, a fine paper as the paper types, but other paper types may also be used.

The user inputs the paper type via the selection screen displayed on the display unit 20, for example. FIG. 6 is a diagram illustrating an exemplary selection screen for the paper type. For example, a selection button (not illustrated) for the "paper type" displayed on the display unit 20 is selected in accordance with an operational command by the user at the input unit 18, thereby displaying the selection screen to select any one of plural kinds of the paper types preliminarily registered (refer to FIG. 6). Further, the paper type of the recording medium for the image forming object is selected in accordance with an additional operational command by the user at the input unit 18, thereby inputting information indicating the paper type of the recording medium for the image forming object to the display processing unit 14.

Returning to FIG. 3, the first acquisition unit 14A stores, in the storage unit 16, the acquired light source information and paper type as setting information set by the user.

Note that the first acquisition unit 14A further acquires a background image. The first acquisition unit 14A may acquire one of image data stored inside the storage unit 16 as the background image, or may acquire an image photographed by the photographing unit 12 as the background image. In the present embodiment, a case where the first acquisition unit 14A acquires the image photographed by the photographing unit 12 as the background image will be described.

The second acquisition unit 14B acquires the posture information of the display unit 20 from the detection unit 25.

The third acquisition unit 14C acquires the document data. The document data is image data indicating an image of a printing object on the recording medium.

The third acquisition unit 14C acquires, as the document data, the image data of the printing object from among a plurality of image data preliminarily stored in the storage unit 16, for example. The user selects the document data via a selection screen displayed on the display unit 20, for example. FIG. 7 is a diagram illustrating an exemplary selection screen for the document data. For example, a selection button (not illustrated) of the "document data" displayed on the display unit 20 is selected in accordance with an operational command by the user at the input unit 18, thereby displaying the selection screen to select any one of the image data preliminarily stored in the storage unit 16 (refer to FIG. 7). Further, the image data of the printing object is selected as the document data of the printing object in accordance with an additional operational command by the user at the input unit 18. By this, the third acquisition unit 14C acquires the selected image data as the document data from the storage unit 16.

Returning to FIG. 3, the calculation unit 14D calculates a second relative position of the light source with respect to the display unit 20 having posture specified by second posture information by using the first relative position, first posture information previously acquired as the posture information, and the second posture information acquired this time as the posture information.

"Previously acquired" means the posture information acquired before the second posture information, and is not limited to the posture information acquired immediately before the second posture information. Note that, in the present embodiment, a case where the first posture information is the posture information acquired at the time of acquiring the first relative position will be described as an example. However, the first posture information is only needed to be the posture information acquired before the second posture information, and is not limited to the posture information acquired at the time of acquiring the first relative position.

In other words, the calculation unit 14D calculates the second relative position of the light source according to the display unit 20 in a current posture by using the first posture information which is the posture information acquired at the time of acquiring the light source information (including the first relative position), the second posture information which is the posture information newly acquired from the detection unit 25 this time, and the first relative position included in the light source information input by the user.

More specifically, the calculation unit 14D first calculates positional relation between the display processing apparatus 10, light source L, and viewpoint P when the light source information is input by the user based on the light source information acquired by the first acquisition unit 14A from the input unit, and the first posture information acquired as the posture information from the detection unit 25 when the second acquisition unit 14B acquires the light source information (including the first relative position).

First, the relation between the display processing apparatus 10 including the display unit 20, the light source, and the viewpoint of the user who visually confirms the display unit 20 will be described.

Figure 8:
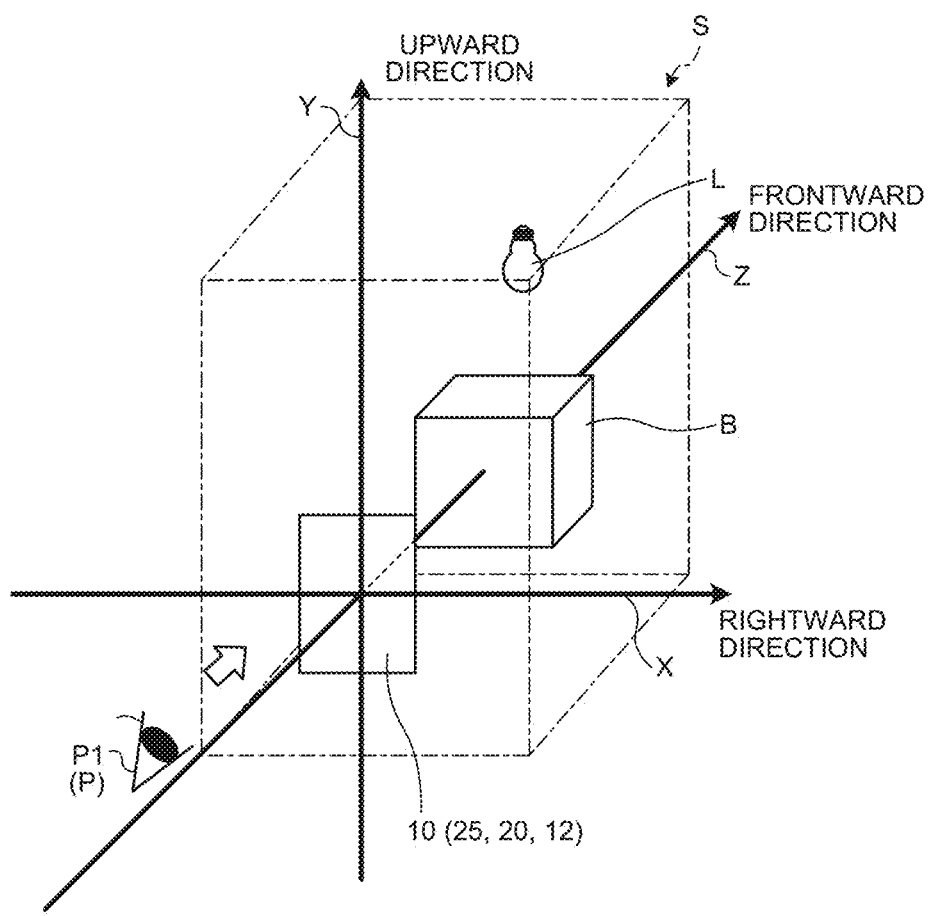
FIG. 8 is a diagram illustrating exemplary positional relation between a display unit, a light source, and a viewpoint.

FIG. 8 is a diagram illustrating exemplary positional relation between the display processing apparatus 10 (display unit 20), the light source L, and the viewpoint P when the light source information is input by the user.

The calculation unit 14D calculates the positional relation between the display processing apparatus 10, light source L, and viewpoint P when the light source information is input by the user based on the light source information that the first acquisition unit 14A acquired from the input unit, and the first posture information that the second acquisition unit 14B acquired as the posture information from the detection unit 25 at the time of acquiring the light source information (first relative position).

As illustrated in FIG. 8, the calculation unit 14D calculates the positional relation based on the first relative position included in the light source information and the first posture information. For example, in the positional relation, the light source L is located at an obliquely upper right position on the rear side of the display unit 20 and a viewpoint P1 is located at a position visually confirming the display surface of the display unit 20 of the display processing apparatus 10 from a direction vertical to the display surface (Z-axis direction) in an actual space S. Note that a reference sign B indicates a background object B in FIG. 8. Further, as described above, the rear side indicates the display surface side of the display unit 20.

Note that the calculation unit 14D places the viewpoint P1 vertical to the display surface of the display unit 20 (Z-axis direction) on the display surface side. The reason is that the user visually confirms various kinds of images displayed on the display unit 20 by visually confirming the display unit 20 from the display surface side.

Further, in the present embodiment, a description will be given under the condition that a photographing direction of the photographing unit 12 is an opposite side of the display surface at the display unit 20. In other words, in the case where a photographed image photographed by the photographing unit 12 is displayed on the display unit 20 while the position of the display processing apparatus 10 is fixed, the photographed image displayed on the display unit 20 and landscape in the real space located at the background of the display unit 20 (opposite side of the display surface of the display unit 20) become the same.

Further, the calculation unit 14D acquires, from the first posture information which is the posture information when the light source information is input by the user, the inclination and facing direction (angle) of the display surface of the display unit 20 in the first coordinate system when the X-axis of the first coordinate system corresponds to the east-west direction, the Y-axis of the first coordinate system corresponds to the vertical direction, and the Z-axis of the first coordinate system corresponds to the north-south direction. In the first coordinate system, the right-and-left direction of the display surface of the display unit 20 is defined as the X-axis, the up-and-down direction thereof is defined as the Y-axis, and the direction vertical to the display surface is defined as the Z-axis.

Note that, in the present embodiment, the upward direction is a direction from a downstream side of the vertical direction to an upstream side of the vertical direction, namely, the positive direction of the Y-axis. Further, the downward direction is a direction from the upstream side of the vertical direction to the downstream side of the vertical direction, namely, a negative direction of the Y-axis. The frontward direction is a direction opposing to the display surface of the display unit 20, namely, the positive direction of the Z-axis. The rearward direction is a direction of the display surface side of the display unit 20, namely, a negative direction of the Z-axis. The leftward direction is the positive direction of the X-axis direction, and the rightward direction is a negative direction of the X-axis direction.

Next, the calculation unit 14D calculates the second relative position of the light source L according to the display unit 20 in the current posture.

Here, the positional relation between the display processing apparatus 10 (display unit 20), light source L, and viewpoint P when the light source information is input by the user is changed by, for example, movement or a holding way of the user.

Figure 9:
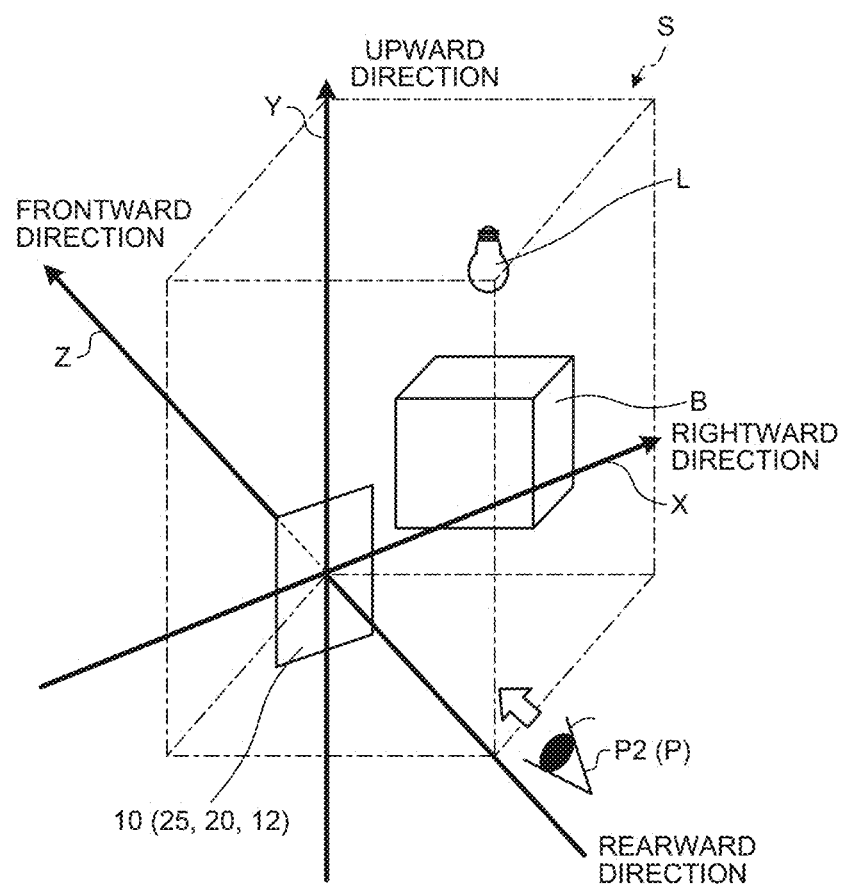
FIG. 9 is a schematic diagram illustrating an exemplary change of the positional relation between the display unit, light source, and viewpoint.
Figure 10:
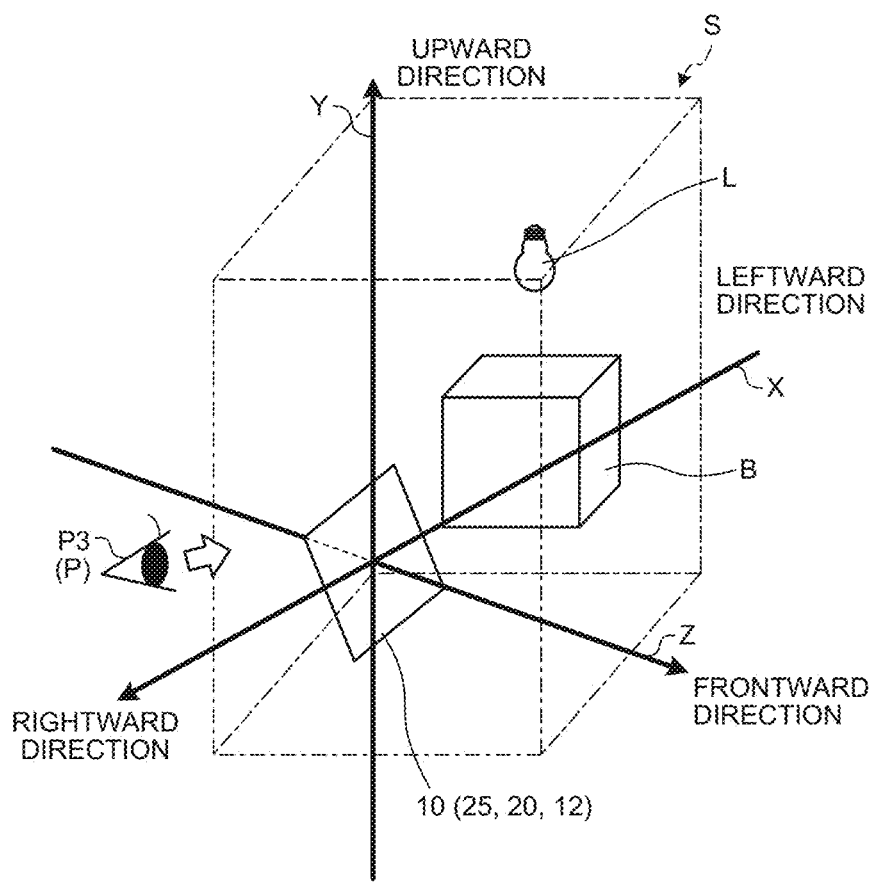
FIG. 10 is a schematic diagram illustrating an exemplary change of the positional relation between the display unit, light source, and viewpoint.
Figure 11:
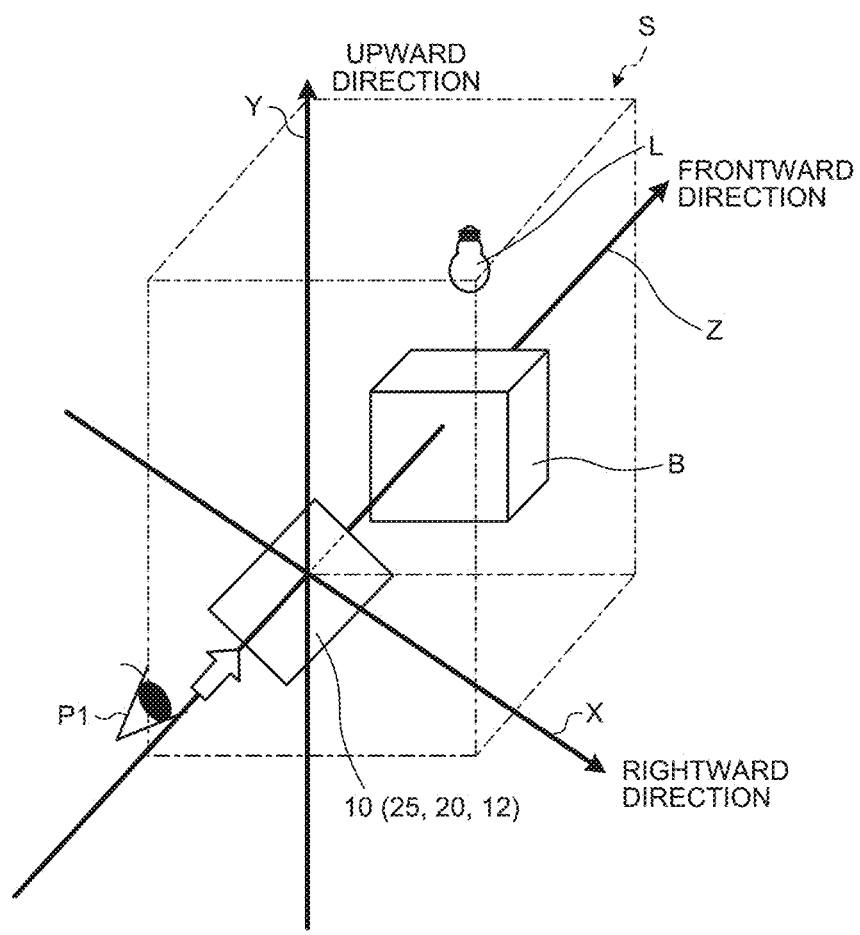
FIG. 11 is a schematic diagram illustrating an exemplary change of the positional relation between the display unit, light source, and viewpoint.

FIGS. 9 to 11 are schematic diagrams illustrating exemplary changes of the positional relation between the display processing apparatus 10 (display unit 20), light source L, and viewpoint P.

Assume that the user's viewpoint P is rotated anticlockwise around a center of the display processing apparatus 10 (display unit 20) and moved from a viewpoint P1 which is a state when the light source information is input by the user (refer to FIG. 8) to a viewpoint P2 (refer to FIG. 9) when viewed from the upper side (upstream side of the vertical direction). In this case, the relative position on the display surface of the display unit 20 with respect to the light source L is changed as illustrated in FIG. 9.

Further, assume that the user's viewpoint P is rotated clockwise around the center of the display processing apparatus 10 (display unit 20) and moved from the viewpoint P1 which is the state when the light source information is input by the user (refer to FIG. 8) to the viewpoint P3 when viewed from the upper side (upstream side of the vertical direction). The viewpoint P3 is a position looking up the display unit 20 from a lower side (refer to FIG. 10). In this case also, the relative position of the display surface of the display unit 20 with respect to the light source L is changed as illustrated in FIG. 10.

Furthermore, assume that the display unit 20 is inclined rightward on a plane along the display surface of the display unit 20 (refer to FIG. 11) from the state when the light source information is input by the user (refer to FIG. 8). In this case also, the relative position of the display surface of the display unit 20 with respect to the light source L is changed as illustrated in FIG. 11.

Returning to FIG. 3, the calculation unit 14D then calculates the second relative position of the light source L with respect to the display unit 20 in the current posture (posture specified by the second posture information).

More specifically, the calculation unit 14D calculates the second relative position of the light source L with respect to the display unit 20 having the posture specified by the second posture information by using the first relative position, first posture information acquired as the posture information at the time of acquiring the first relative position, and second posture information acquired this time as the posture information.

First, the calculation unit 14D acquires rotation angles (pitch, roll, and yaw) to bring the display unit 20 having the posture specified by the first posture information of the display unit 20 into the posture specified by the second posture information.

Figure 12:
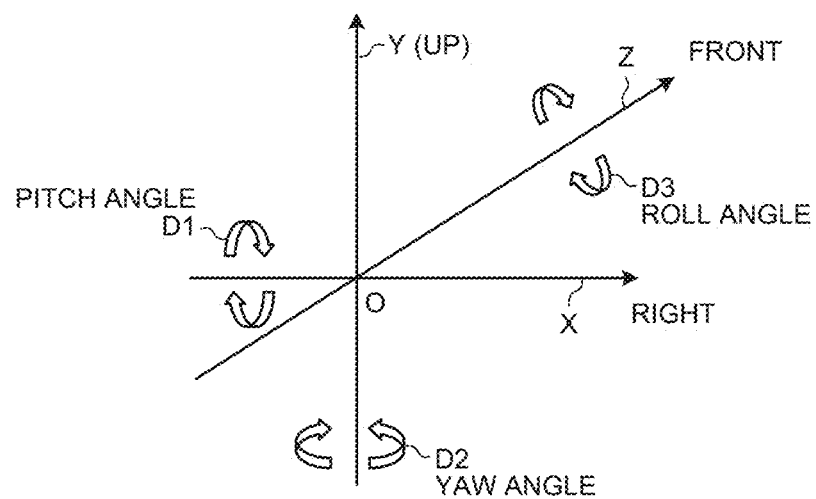
FIG. 12 is an explanatory diagram illustrating rotation angles.

FIG. 12 is an explanatory diagram illustrating the rotation angles. In the present embodiment, a description will be given under the condition that rotation around the Z-axis as a rotary axis is defined as a roll angle (refer to an arrow D3 in FIG. 12), rotation around the X-axis as a rotary axis is defined as a pitch angle (refer to an arrow D1 in FIG. 12), and rotation around the Y-axis as a rotary axis is defined as a yaw angle (refer to an arrow D2 in FIG. 12) as for the X-axis, Y-axis, and Z-axis in the first coordinate system described by using in FIG. 2B.

Further, the calculation unit 14D calculates, as the second relative position, a position obtained by rotating the first relative position by an angle corresponding to the rotation angle from the posture specified by the first posture information to the posture specified by the second posture information.

Figure 13:
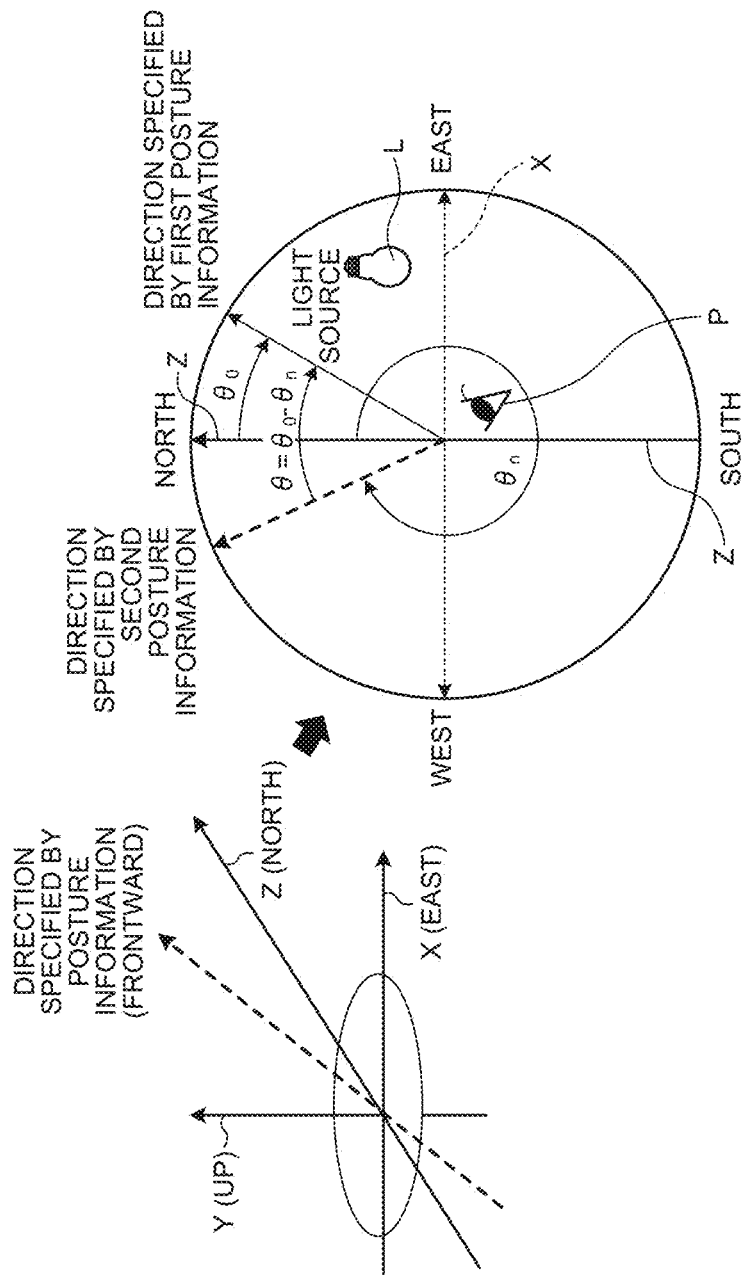
FIGS. 13A and 13B are explanatory diagrams illustrating a calculation method for a second relative position.
Figure 14:
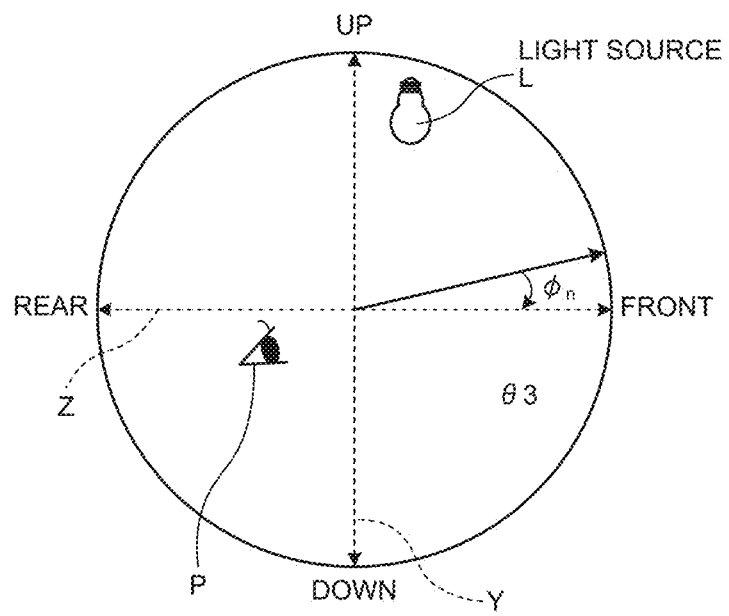
FIG. 14 is an explanatory diagrams illustrating the calculation method for the second relative position.

FIGS. 13A, 13B and FIG. 14 are explanatory diagrams illustrating a calculation method for the second relative position.

Here, assume that the yaw angle, roll angle, and pitch angle of the display unit 20 specified by the first posture information are a yaw angle $\theta_0$, a roll angle $\rho_0$, and a pitch angle $\phi_0$ respectively.

Further, assume that the yaw angle, roll angle, and pitch angle of the display unit 20 specified by the second posture information are a yaw angle $\theta n$, a roll angle $\rho n$, and a pitch angle $\psi n$ respectively.

In this case, the calculation unit 14D calculates respective rotation angles of the yaw angle, roll angle, and pitch angle of the display unit 20 from the posture specified by the first posture information (yaw angle $\theta_0$, roll angle $\rho_0$, pitch angle $\phi_0$) to the posture specified by the second posture information (yaw angle $\theta n$, roll angle $\rho n$, and pitch angle $\psi n$). Further, the calculation unit 14D calculates, as the second relative position, the position obtained by rotating the first relative position by the rotation angles corresponding to the respective calculated yaw angle, roll angle, and pitch angle.

FIGS. 13A and 13B are the explanatory diagrams illustrating calculation of the second relative position in a yaw angle rotary direction. The rotation angle θ in the yaw angle rotary direction of the display unit 20 from the posture specified by the first posture information to the posture specified by the second posture information is expressed by a following Expression (1).

$$\theta = \theta_0 - \theta n \quad (1)$$

Therefore, the calculation unit 14D calculates, as the second relative position concerning the yaw angle rotary direction, a position obtained by rotating the first relative position by the rotation angle θ.

FIG. 14 is the explanatory diagram illustrating calculation of the second relative position in a pitch angle rotary direction. The rotation angle ϕ in the pitch angle rotary direction of the display unit 20 from the posture specified by the first posture information to the posture specified by the second posture information is expressed by a following Expression (2).

$$\phi = \phi_0 - \phi n \quad (2)$$

Note that a case of $\phi_0 = 0$ (display unit 20 is in a horizontal state) is illustrated in FIG. 14 as an example.

Therefore, the calculation unit 14D calculates, as the second relative position in the pitch angle rotary direction, a position obtained by rotating the first relative position by the rotation angle ϕ.

The calculation unit 14D also calculates the second relative position in a roll angle rotary direction in the same manner. More specifically, the rotation angle ρ in the roll angle rotary direction of the display unit 20 from the posture specified by the first posture information to the posture specified by the second posture information is expressed by a following Expression (3).

$$\rho = \rho_0 - \rho n \quad (3)$$

In the case of $\rho_0 = 0$, the display unit 20 is in the horizontal state.

Therefore, the calculation unit 14D calculates, as the second relative position in the roll angle rotary direction, a position obtained by rotating the first relative position by the rotation angle ρ.

As described above, the calculation unit 14D calculates, as the second relative position, the position obtained by rotating the first relative position by the angle corresponding to the differences of the respective calculated rotation angles (yaw angle θ, roll angle ρ, pitch angle ϕ) between the first posture information and the second posture information.

Returning to FIG. 3, the generation unit 14E subsequently generates a document display surface where a state in which the document surface displaying the document data is disposed in the virtual three-dimensional space and the light source L is disposed at the second relative position with respect to the document surface is converted to a two-dimensional image visually confirmed from a viewpoint position located in a normal line of the document surface. In order to convert the state formed inside the virtual space into the two-dimensional image visually confirmed from the viewpoint position, a 3D graphic engine may be utilized, for example.

More specifically, the generation unit 14E generates the document display surface by reflecting a light source image on the document surface displaying the document data. In the light source image, reflectance in accordance with the light source L positioned at the second relative position is set for each pixel. In the present embodiment, the light source image is the image data in which a transmissivity is specified for each pixel position.

More specifically, the generation unit 14E generates a function corresponding to the light source image by calculating the reflectance for each pixel in each pixel position in accordance with the second relative position.

The reflectance of the pixel in each pixel position is determined by the viewpoint position of the viewpoint P located in the normal line of the display unit 20, the position of the light source L with respect to the display unit 20 (here, second relative position), and a pixel position V on the document surface displayed on the display unit 20.

Here, assume that an angle formed by the viewpoint position (defined as PA), the position of the light source L (defined as LA), and the pixel position V (angle between a line connecting the viewpoint position PA to the pixel position V and a line connecting the relative position LA of the light source to the pixel position V) is defined as θ. Then, a brightness level provided at the angle θ can be expressed as max (0, cos θ). Further, the brightness level is set in accordance with a distance between the pixel position V and the relative position LA of the light source L or the square of the distance. Then, multiplication (function) of the brightness level and the brightness level at the angle θ may be set as the reflectance of the pixel in each pixel position.

Therefore, for example, in the case where the relative position of the light source L with respect to the display unit 20 is located in the upper right direction of the display unit 20, the closer to the upper right direction the pixel is, the higher reflectance is, and the closer to a lower left direction the pixel is, the lower reflectance is when the light source image expressed by the above function is displayed on the display unit 20.

Next, the generation unit 14E generates the document display surface by reflecting the light source image expressed by the above function on the document surface displaying the document data, using the 3D graphic engine such as the OpenGL.

Note that the generation unit 14E may preliminarily store first reflectance information in the storage unit 16. The first reflectance information is the information correlating preliminarily the relative position of the light source L with respect to the display unit 20 to the reflectance information. The reflectance information is the information to specify, for each pixel in each pixel position, the reflectance of light of the light source L at the corresponding relative position on the display surface of the display unit 20. In this case, the generation unit 14E preliminarily calculates, as the reflectance, a value of the above function (value determined in accordance with the angle θ) for each pixel position, corresponding to the relative position of the light source L, and may preliminarily store the value as the first reflectance information. Further, the generation unit 14E reads, from the first reflectance information, the reflectance information corresponding to the relative position as the second relative position. Then, the generation unit 14E may read, as the light source image, the reflectance information which is read from the first reflectance information and specifies the reflectance for each pixel.

Meanwhile, the generation unit 14E may generate the document display surface on which the light source image is reflected on the document surface. In the light source image, a light amount in accordance with the light source type and the reflectance in accordance with the light source L positioned at the second relative position are set for each pixel.

In this case, the generation unit 14E preliminarily stores, in the storage unit 16, the light source type information that correlates the light source type to the light amount. The light amount indicates a light amount in the case of expressing the light in accordance with each light source type. The light amount includes at least one of a specular light amount, a diffused light amount, and an environment light amount. The light source type information may be suitably changeable in accordance with an operational command by the user at the input unit 18.

Further, the generation unit 14E reads, from the light source type information, the light amount corresponding to the light source type included in the light source information input by the user. Then, the generation unit 14E sets, for each pixel of the light source image, the read light amount as a parameter at the time of display.

Also, the generation unit 14E may generate the document display surface on which the light source image is reflected on the document surface, and in the light source image, the reflectance in accordance with the paper type of the recording medium for the image forming object and further in accordance with light source L positioned at the second relative position is set for each pixel. In the case where the first acquisition unit 14A further acquires the paper type, the generation unit 14E may generate the document display surface on which the light source image in accordance with the paper type is reflected on the document surface.

In this case, the generation unit 14E preliminarily stores, in the storage unit 16, third reflectance information that specifies, for each pixel in each pixel position, an alpha value (transmissivity) corresponding to the type of paper quality, and the relative position of the light source L with respect to the display unit 20, for example. The third reflectance information is, for example, the reflectance corresponding to the type of paper quality, and also specifies the reflectance for each pixel in each position such that the closer to the light source L the pixel is positioned on the display surface of the display unit 20, the higher the reflectance is. Also, the third reflectance information is, for example, the reflectance corresponding to the type of paper quality, and also specifies the reflectance for each pixel in each position such that the more distant from the light source L the pixel is positioned, the lower the reflectance is. The reflectance is represented by, for example, the alpha value. Note that the higher the reflectance is, the lower the alpha value (transmissivity) is. Further, the reflectance specified by the second reflectance information also includes the specular light reflectance, diffused light reflectance, and environment light reflectance as described above.

Subsequently, the generation unit 14E reads, from the third reflectance information, the reflectance information corresponding to the type of paper quality and the relative position as the second relative position. Further, the generation unit 14E reads, as the light source image, the reflectance information which is read from the third reflectance information and specifies the reflectance for each pixel.

Therefore, assume that the relative position of the light source L with respect to the display unit 20 is located in the upper right direction of the display unit 20, for example. In this case, the generation unit 14E generates the light source image in which the reflectance corresponding to the type of paper quality is set for each pixel. Further, the reflectance is set for each pixel such that the closer to the upper right side of the display surface of the display unit 20 the pixel is, the higher the reflectance is, the closer to the lower left thereof the pixel is, the lower the reflectance is.

Further, the generation unit 14E generates the document display surface on which the generated light source image is reflected on the document surface. As described above, the generation unit 14E generates the document display surface by performing alpha-blend of the document surface and the light source image.

Returning to FIG. 3, the display control unit 14F executes control to display a superimposed image on the display unit 20 as a preview image estimating a printing result of document data. The superimposed image is obtained by superimposing the background image and the document display surface generated at the generation unit 14E. The display control unit 14F is implemented by, for example, a 3D engine such as the open graphics library (OpenGL).

Figure 15:
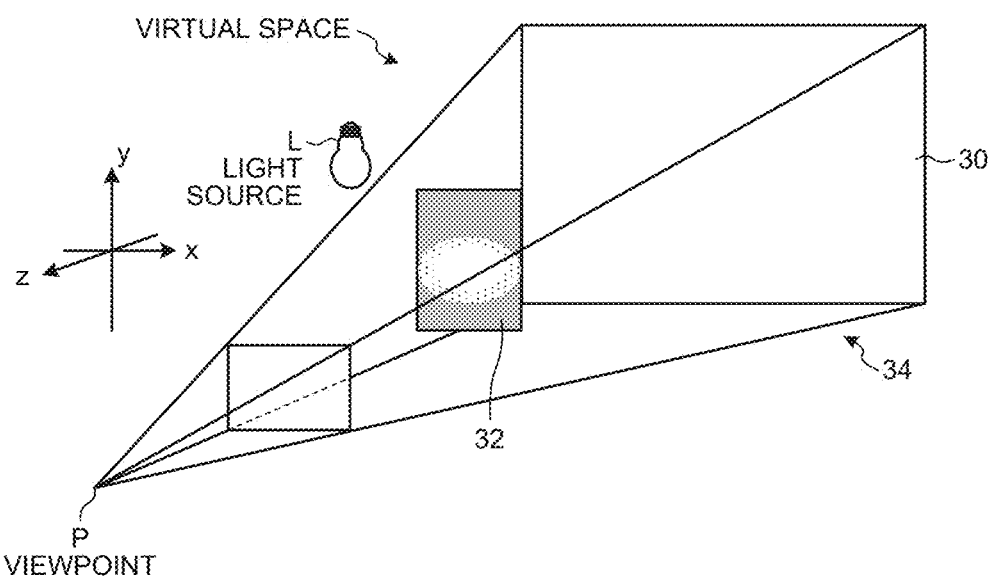
FIG. 15 is a schematic diagram illustrating a virtual three-dimensional space for forming a preview image.

FIG. 15 is a schematic diagram illustrating a virtual three-dimensional space for forming a preview image 34.

The display control unit 14F disposes a document display surface 32 generated at the generation unit 14E inside the virtual three-dimensional space (may be simply referred to as a virtual space), and also disposes the light source L at the second relative position. Then, the display control unit 14F disposes the background image 30 behind the document display surface 32. Subsequently, the display control unit 14F disposes the viewpoint P on the rear side (on the display surface side of the display unit 20) with respect to the document display surface 32 in a normal line at a center of the document display surface 32.

Note that the document display surface 32 is the display surface on which the light source image is reflected as described above. Further, the light source image is the image in which the reflectance in accordance with the second relative position is specified for each pixel. The second relative position is the relative position of the light source L with respect to the display unit 20 having the posture specified by the second posture information. Therefore, the light from the light source L in accordance with the second relative position is reflected on the document display surface 32.

Further, the display control unit 14F executes control to convert the state formed inside the virtual space into a two-dimensional image visually confirmed from the viewpoint position of the viewpoint P by utilizing the 3D graphic engine, and display the two-dimensional image on the display unit 20 as the preview image 34.

FIGS. 16 to 20 are diagrams illustrating exemplary preview images 34.

For example, assume that the second relative position of the light source L is at a position corresponding to an upper side of the display unit 20 (upstream side of the vertical direction). In this case, a preview image 34A illustrated in FIG. 16 is displayed on the display unit 20.

Figure 16:
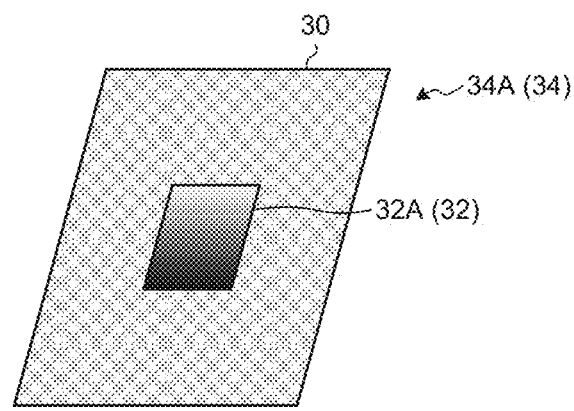
FIG. 16 is a diagram illustrating an exemplary preview image.

As illustrated in FIG. 16, the generation unit 14E generates a document display surface 32A on which the light source image is reflected on the document surface, and in the light source image, the reflectance in accordance with the light source L positioned on the upper side of the display unit 20 (second relative position) is set for each pixel. Therefore, the preview image 34A is to be a superimposed image obtained by superimposing the document display surface 32A on the background image 30. Further, the reflectance in each pixel of the document display surface 32A is higher on the upper side, and lower on the lower side in accordance with the second relative position (refer to FIG. 16). Therefore, on the display unit 20, the preview image 34A including the document display surface 32A having the reflectance corresponding to the relative position of the light source L (second relative position) in accordance with the current posture information of the display unit 20 is displayed.

Figure 17:
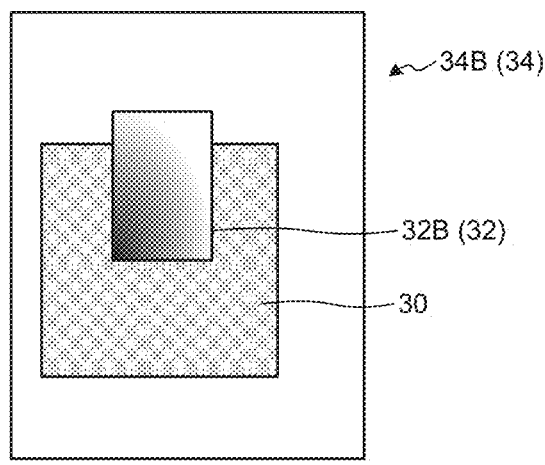
FIG. 17 is a diagram illustrating an exemplary preview image.

Further, assume that the second relative position of the light source L is located at the position illustrated in FIG. 8, for example. In this case, as described in FIG. 8, the light source L is located at the obliquely right upward position on the rear side of the display unit 20. More specifically, when the viewpoint P is placed on the display surface side in the normal line (Z-axis direction) vertical to the display surface of the display unit 20 and the display unit 20 is viewed from the viewpoint P, the light source L is located at the obliquely right upward position on the rear side of the display unit 20. Note that the "rear side" indicates the viewpoint P side (display surface side) of the display unit 20 as described above. Also, the example illustrated in FIG. 17 illustrates a case where the light source type is a spot light. In this case, a preview image 34B illustrated in FIG. 17 is displayed on the display unit.

As illustrated in FIG. 17, the generation unit 14E generates a document display surface 32B on which the light source image is reflected on the document surface. In the light source image, the reflectance in accordance with the light source L positioned on an upper right rear side of the display unit 20 (second relative position) is set for each pixel. Therefore, the preview image 34B is to be a superimposed image obtained by superimposing the document display surface 32B on the background image 30. Further, the reflectance in each pixel on the document display surface 32B is higher on an oblique upper right side, and lower on an oblique lower left side (refer to FIG. 17) in accordance with the second relative position. Therefore, on the display unit 20, a preview image 34C including the document display surface 32B having the reflectance corresponding to the relative position of the light source L (second relative position) in accordance with the current posture information of the display unit 20 is displayed.

Further, for example, assume that the second relative position of the light source L is at a position corresponding to the upper rear side of the display unit 20. More specifically, assume the light source L is positioned on the rear side of the display unit 20 (display surface side (viewpoint P side)) in the upper direction of the display unit 20 when the viewpoint P is located on the display surface side in the normal line (Z-axis direction) vertical to the display surface of the display unit 20 and the display unit 20 is viewed from the viewpoint P. In this case, the preview image 34C illustrated in FIG. 18 is displayed on the display unit 20.

Figure 18:
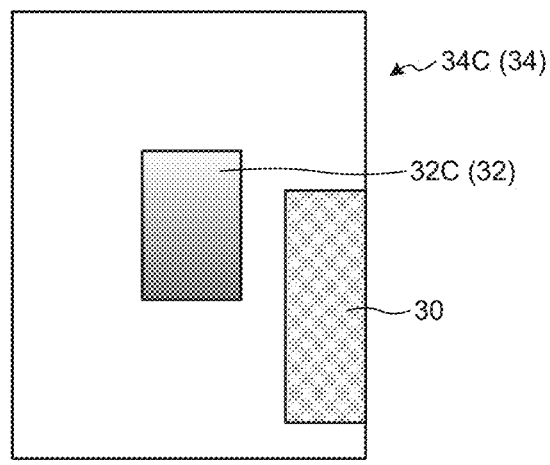
FIG. 18 is a diagram illustrating an exemplary preview image.

As illustrated in FIG. 18, the generation unit 14E generates the document display surface 32C on which the light source image is reflected on the document surface. In the light source image, the reflectance in accordance with the light source L positioned on the upper rear side of the display unit 20 (second relative position) is set for each pixel. Therefore, the preview image 34C is to be a superimposed image obtained by superimposing the document display surface 32C on the background image 30. Further, the reflectance in each pixel of the document display surface 32C is higher on the upper side, and lower on the lower side in accordance with the second relative position (refer to FIG. 18). Additionally, compared to the case illustrated in FIG. 16 where "the second relative position of the light source L is located at the position corresponding to the upper side of the display unit 20", entire reflectance of the document display surface 32C is higher than the document display surface 32A (refer to FIG. 16) because the second relative position of the light source L is positioned on the upper rear side of the display unit 20.

Therefore, on the display unit 20, the preview image 34C including the document display surface 32C having the reflectance corresponding to the relative position of the light source L (second relative position) in accordance with the current posture information of the display unit 20 is displayed.

Further, for example, assume that the second relative position of the light source L is located at a position corresponding to the frontward direction (direction opposing to the display surface (opposite direction of the viewpoint P)) of the Z-axis direction with respect to the display unit 20 (normal line with respect to the display surface). In other words, assume that the light source L is positioned on the opposite side of the viewpoint P interposing the display unit 20 when the viewpoint P is placed on the display surface side of the normal line (Z-axis direction) vertical to the display surface of the display unit 20.

Figure 19:
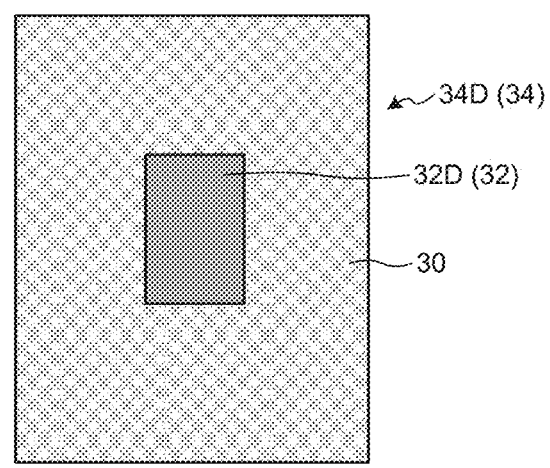
FIG. 19 is a diagram illustrating an exemplary preview image.

In this case, a preview image 34D illustrated in FIG. 19 is displayed on the display unit 20.

As illustrated in FIG. 19, the generation unit 14E generates a document display surface 32D on which the light source image is reflected on the document surface. In the light source image, the reflectance in accordance with the light source L positioned on the opposite side of the display surface (second relative position) of the display unit 20 is set for each pixel. Therefore, the preview image 34D is to be a superimposed image obtained by superimposing the document display surface 32D on the background image 30. Further, the reflectance in each pixel on the document display surface 32D has entirely low reflectance in accordance with the second relative position (refer to FIG. 19).

Therefore, on the display unit 20, the preview image 34D including the document display surface 32D having the reflectance corresponding to the relative position of the light source L (second relative position) in accordance with the current posture information of the display unit 20 is displayed.

Further, assume that the second relative position of the light source L is located at the position illustrated in FIG. 11, for example. In this case, the light source L is positioned on the upper side of the display unit 20. More specifically, when the viewpoint P is placed on the display surface side in the normal line (Z-axis direction) vertical to the display surface of the display unit 20 and the display unit 20 is viewed from the viewpoint P, the light source L is positioned on the upper side of the display unit 20. Further, as described in FIG. 11, the state illustrated in FIG. 11 is the state in which the display unit 20 is inclined rightward on the plane along the display surface of the display unit 20 from the state when the light source information is input by the user (refer to FIG. 8). In this case, a preview image 34E illustrated in FIG. 20 is displayed on the display unit.

Figure 20:
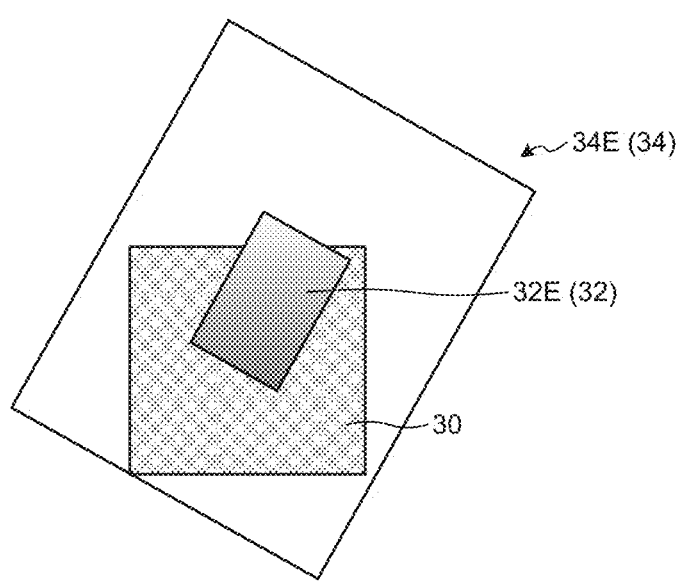
FIG. 20 is a diagram illustrating an exemplary preview image.

As illustrated in FIG. 20, the generation unit 14E generates a document display surface 32E on which the light source image is reflected on the document surface. In the light source image, the reflectance in accordance with the light source L positioned on upper side of the display unit 20 inclined rightward (second relative position) is set for each pixel. Therefore, the preview image 34E is to be a superimposed image obtained by superimposing the document display surface 32E on the background image 30. Further, the reflectance in each pixel on the document display surface 32E is higher on the upper side of the display surface of the display unit 20 inclined rightward, and lower on the lower side thereof (refer to FIG. 20) in accordance with the second relative position. Therefore, on the display unit 20, the preview image 34E including the document display surface 32E having the reflectance corresponding to the relative position of the light source L (second relative position) in accordance with the current posture information of the display unit 20 is displayed.

Figure 21:
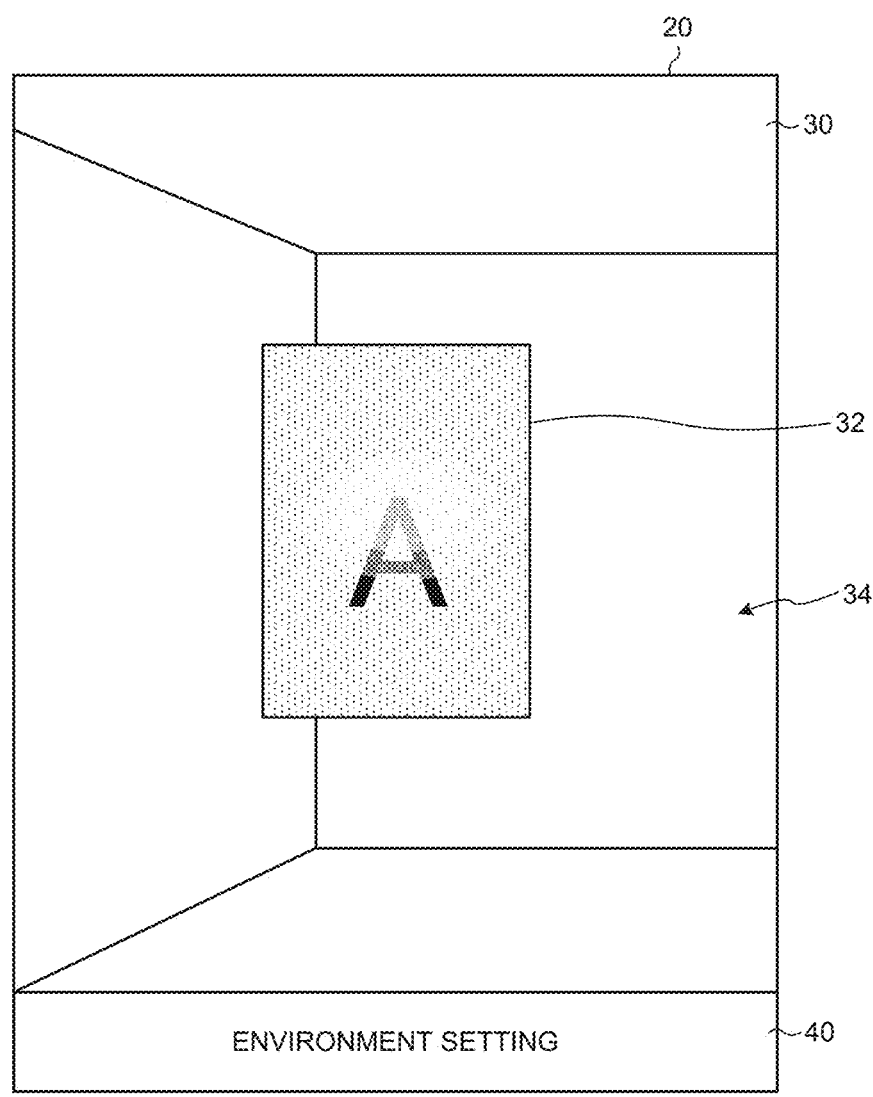
FIG. 21 is a schematic diagram illustrating an exemplary display unit on which a preview image is displayed.

FIG. 21 is a schematic diagram illustrating an exemplary display unit 20 at which the preview image 34 is displayed. The display unit 20 includes an environment setting button 40 and the preview image 34 on which the document display surface 32 is superimposed on the background image 30. The environment setting button 40 is an area to be operated at the time of inputting or selecting the light source information, selecting the paper type, and inputting or operating the background image. The user operates the display area of the environment setting button 40 by the input unit 18, thereby displaying the input screen or the selection screen illustrated in FIGS. 4 to 7 on the display unit 20, and enabling inputting or selecting the light source information, paper type, background image, and so on.

Meanwhile, in the case where the display unit 20 and the input unit 18 are integrally formed as a touch panel, operation such as pinch-in and pinch-out by the user may be received. In this case, enlargement/reduction of the document display surface 32 is commanded by an operational command by the user at the display unit 20. The user commands enlargement/reduction of the document display surface 32 by executing pinch-in or pinch-out on the display area of the document display surface 32.

The display control unit 14F may also regenerate the preview image 34 by enlarging or reducing the document display surface 32 at an enlargement ratio or a reduction ratio according to the pinch-in or pinch-out input by the user, and display the preview image on the display unit 20.

Figure 22:
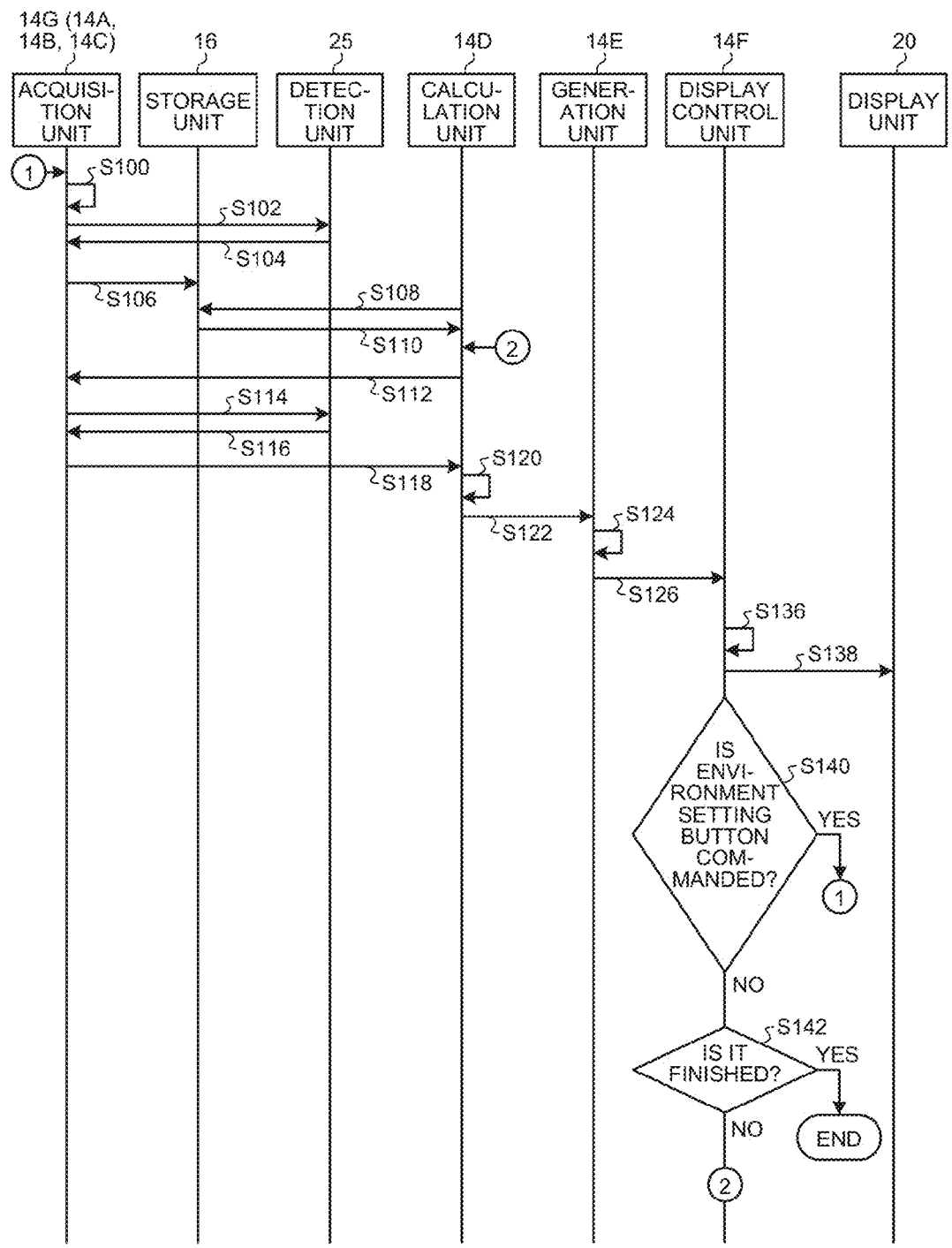
FIG. 22 is a sequence diagram illustrating an exemplary procedure of display processing.

FIG. 22 is a sequence diagram illustrating display processing procedure executed at the display processing unit 14.

First, the acquisition unit 14G acquires the light source information, paper type, background information, and document data (Step S100). More specifically, the first acquisition unit 14A acquires the light source information (first relative position, light source type), paper type, and background image. Also, the third acquisition unit 14C acquires the document data.

Next, the second acquisition unit 14B acquires the posture information of the display unit 20 from the detection unit 25 (Step S102, Step S104).

The acquisition unit 14G stores, in the storage unit 16, the light source information (first relative position, light source type), and paper type acquired in Steps S100 to S104 as the setting information set by the user (Step S106). Further, the acquisition unit 14G stores, in the storage unit 16, the posture information (first posture information), background image 30, and document data acquired in Steps S100 to S104 (Step S106).

Next, the calculation unit 14D reads the setting information, first posture information, and document data from the storage unit 16 (Step S108 and Step S110). Next, the calculation unit 14D transmits an acquisition request for the posture information of a current display unit 20 to the acquisition unit 14G (Step S112). The second acquisition unit 14B of the acquisition unit 14G acquires the posture information of the current display unit 20 from the detection unit 25, and transmits the same to the calculation unit 14D (Steps S114 to S118).

The calculation unit 14D calculates the second relative position of the light source L with respect to the display unit 20 having the posture specified by the second posture information by using the first relative position included in the setting information acquired in Step S110, the first posture information acquired in Step S110, and the second posture information acquired as the posture information in Step S118 (Step S120).

Further, the calculation unit 14D transmits, to the generation unit 14E, the calculated second relative position and the document data acquired in Step S110 (Step S122).

The generation unit 14E generates the document display surface where a state in which the document surface displaying the document data is disposed in the virtual three-dimensional space and also the light source L is disposed at the second relative position received in Step S122 with respect to the document surface is converted to the two-dimensional image visually confirmed from the viewpoint position located in the normal line of the document surface (Step S124). Further, the generation unit 14E transmits the generated document display surface 32 to the display control unit 14F (Step S126).

The display control unit 14F generates, as the preview image 34, the superimposed image obtained by superimposing the document display surface 32 received in Step S126 on the background image 30 (Step S136). Further, the display control unit 14F executes control to display the generated preview image 34 on the display unit 20 (Step S138).

Next, the display control unit 14F determines whether a command is made on the environment setting button 40 (refer to FIG. 21) at the display unit 20 by the user (Step S140). The display control unit 14F makes determination in Step S140 by detecting whether a signal indicating that the command is provided by the user on a display area of the environment setting button 40 at the input unit 18 is received.

When affirmative determination is made in Step S140 (Step S140: Yes), the processing returns to Step S100. On the other hand, when negative determination is made in Step S140 (Step S140: No), the processing proceeds to Step S142.

In Step S142, the display control unit 14F determines whether to finish displaying the preview image 34 (Step S142). The display control unit 14F makes determination in Step S142 by detecting whether the user operated the area preliminarily set or the button provided at the display processing apparatus 10 to command "finish display processing" at the display unit 20.

When affirmative determination is made in Step S142 (Step S142: Yes), this routine ends. On the other hand, when negative determination is made in Step S142 (Step S142: No), the processing returns to Step S112. Therefore, the display processing apparatus 10 repeatedly executes the processing from Step S112 to Step S142 until the affirmative determination is made in Step S142 (Step S142: Yes). In other words, the preview image 34 including the document display surface 32 in accordance with change of the posture of the display unit 20 is repeatedly displayed.

Note that the display control unit 14F may repeat the processing from Step S112 to Step S142 at predetermined time intervals.

In this case, the second acquisition unit 14B acquires the posture information of the display unit 20 from the detection unit 25 at predetermined time intervals, the calculation unit 14D calculates the second relative position every time the posture information is acquired, the generation unit 14E generates the document display surface 32 every time the second relative position is calculated, and the display control unit 14F executes control to display, as the preview image 34, the superimposed image on the display unit 20 every time the document display surface 32 is generated.

As described above, in the display processing apparatus 10 of the present embodiment, the first acquisition unit 14A acquires the light source information including the first relative position of the light source L with respect to the display unit 20. The second acquisition unit 14B acquires the posture information of the display unit 20 from the detection unit 25 which detects the posture information. The third acquisition unit 14C acquires the document data. The calculation unit 14D calculates the second relative position of the light source L with respect to the display unit 20 having the posture specified by second posture information by using the first relative position, first posture information acquired as the posture information at the time of acquiring the first relative position, and the second posture information acquired this time as the posture information. The generation unit 14E generates the document display surface 32 where the state in which the document surface displaying the document data is disposed in the virtual three-dimensional space and also the light source L is disposed at the second relative position with respect to the document surface is converted to the two-dimensional image visually confirmed from the viewpoint position located in the normal line of the document surface. The display control unit 14F executes control to display the superimposed image on the display unit 20 as the preview image 34 estimating the printing result of the document data. The superimposed image is obtained by superimposing the document display surface 32 and the background image 30 of the observation environment in the real space.

Thus, the display processing apparatus 10 of the present embodiment calculates the second relative position of the light source L with respect to the display unit 20 having the current posture by using the first posture information and second posture information. Further, the display processing apparatus 10 generates the document display surface 32 on which the light source image is reflected on the document surface. In the light source image, the reflectance in accordance with the second relative position of the light source L is set for each pixel. Then, control is executed to display the superimposed image on the display unit 20 as the preview image 34. The superimposed image is obtained by superimposing the document display surface 32 on the background image 30.

Therefore, the display processing apparatus 10 of the present embodiment can display, on the display unit 20, the preview image 34 including the document display surface 32 on which a light environment in accordance with the current posture information (posture) of the display unit 20 is reflected.

Therefore, according to the display processing apparatus 10 of the present embodiment, there is an advantageous effect that the preview image 34 in accordance with the posture of the display unit 20 can be provided.

Therefore, the user can visually confirm the preview image 34 including the document display surface 32 on which the light environment in accordance with the posture, such as inclination and the angle of the display unit 20, is reflected in the same sense as the case of visually confirming a printed matter in the real space.

Further, in the display processing apparatus 10 of the present embodiment, the processing from Step S112 to Step S142 is repeatedly executed in the case where negative determination is made in Step S142 (Step S142: No) or at the predetermined time intervals.

Therefore, even in the case where the positional relation between the display processing apparatus 10 (display unit 20), light source L, and viewpoint P is changed due to change of the posture of the display unit 20, the preview image 34 on which the light environment in accordance with the change of the posture of the display unit 20 is reflected can be displayed.

Second Embodiment

Note that, in an above-described embodiment, a description has been given for a case where a display processing apparatus 10 includes a photographing unit 12 and a background image is acquired from the photographing unit 12.

However, the display processing apparatus 10 may be configured without the photographing unit 12.

Figure 23:
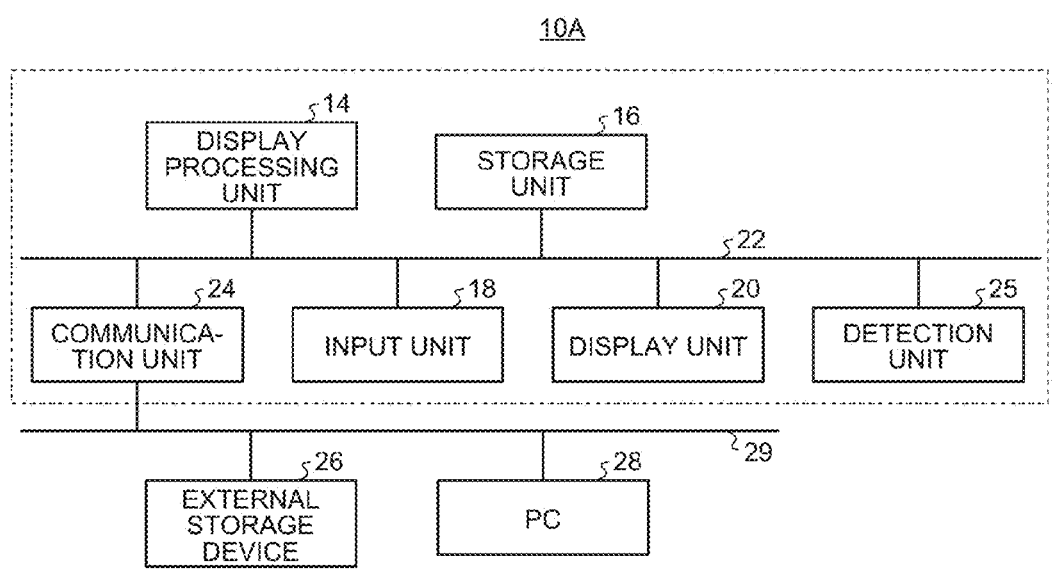
FIG. 23 is a schematic diagram illustrating an exemplary display processing apparatus.

FIG. 23 is a schematic diagram illustrating an exemplary display processing apparatus 10A not including the photographing unit 12.

The display processing apparatus 10A includes a display processing unit 14, a storage unit 16, an input unit 18, a display unit 20, a communication unit 24, and a detection unit 25. The display processing unit 14, storage unit 16, input unit 18, display unit 20, communication unit 24, and detection unit 25 are electrically connected via a bus 22. Note that the display processing unit 14, storage unit 16, input unit 18, display unit 20, and detection unit 25 are same as the above embodiment.

The communication unit 24 is a communication interface to execute signal transfer with an external storage device 26 via a network 29. The network 29 is connected to the display processing apparatus 10A, the external storage device 26, and a personal computer (PC) 28.

The external storage device 26 preliminarily stores various background images of observation environment which may be an object of which the display processing apparatus 10A may display a preview image 34. The background images can be acquired by reading these background images from the external storage device 26 via a first acquisition unit 14A (not illustrated in FIG. 23) of the display processing unit 14, communication unit 24, and network 29.

Thus, the display processing apparatus 10A may acquire the background images from an external device.

Third Embodiment

Note that, in a first embodiment, a description has been given for a case where a calculation unit 14D (refer to FIG. 3) calculates a second relative position of a light source L with respect to a display unit 20 having a posture specified by second posture information by using a first relative position, first posture information, and the second posture information.

However, the calculation unit 14D may calculate the second relative position of the light source L by using the first relative position, first posture information, second posture information, and a first absolute position indicating latitude and longitude of the display unit 20.

In this case, a detection unit 25 is configured to be capable of further detecting the first absolute position indicating the latitude and longitude where the display unit 20 is positioned. The first absolute position indicates an absolute position of the display unit 20 in a two-dimensional real space specified by the latitude and longitude.

More specifically, the detection unit 25 is configured to further include a function of a global positioning system (GPS) (for example, a function to receive a signal from a GPS satellite, and a function to execute two-dimensional positioning) in addition to a function to be capable of detecting inclination and an angle described in the first embodiment.

Further, a second acquisition unit 14B further acquires the first absolute position indicating the current latitude and longitude of the display unit 20 from the detection unit 25 at the time of acquiring the posture information of the display unit 20 from the detection unit 25.

Then, a calculation unit 14D may calculate the second relative position of the light source L by using the first relative position, first posture information, second posture information, and first absolute position indicating the latitude and longitude of the display unit 20.

More specifically, the calculation unit 14D calculates a moving vector amount $\beta$ of the display unit 20 in a two-dimensional space specified by the latitude/longitude based on a difference between the first absolute position at the time of acquiring the first posture information and the first absolute position at the time of acquiring the second posture information. Then, the calculation unit 14D converts the moving vector amount to a vector α having 1-cm unit usable on a ZX plane illustrated in FIG. 2.

Further, same as the first embodiment, the calculation unit 14D calculates a position (defined as a first position γ) obtained by rotating the first relative position by an angle corresponding to a difference of each of rotation angles (yaw angle θ, roll angle ρ, pitch angle φ) between the calculated first posture information and second posture information.

Then, the calculation unit 14D further calculates, as a second relative position, a position obtained by adding, to the first position γ, the vector α which has been rotated by an angle −θn (yaw angle θn of the display unit 20 specified by the second posture information (refer to FIG. 13)).

Thus, the calculation unit 14D can calculate the second relative position with higher accuracy by calculating the second relative position by using the first absolute position, first relative position, first posture information, and second posture information, compared to the case of not using the first absolute position.

Therefore, according to the display processing apparatus 10 of the present embodiment, there is a further advantageous effect that a preview image 34 in accordance with a current posture of the display unit 20 can be provided with high accuracy in addition to an advantageous effect of the first embodiment.

Fourth Embodiment

Note that, in a first embodiment, a description has been given for a case where a calculation unit 14D (refer to FIG. 3) calculates a second relative position of a light source L with respect to a display unit 20 having a posture specified by second posture information by using a first relative position, first posture information, and the second posture information.

However, the calculation unit 14D may calculate the second relative position of the light source L by using the first relative position, first posture information, second posture information, and a first absolute position indicating latitude, longitude, and altitude of the display unit 20.

In this case, a detection unit 25 is configured to be capable of further detecting a second absolute position indicating the latitude, longitude, and altitude where the display unit 20 is positioned. The second absolute position indicates an absolute position of the display unit 20 in a three-dimensional real space specified by the latitude, longitude, and altitude.

More specifically, the detection unit 25 is configured to further include a function of a global positioning system (GPS) (for example, a function to receive a signal from a GPS satellite, and a function to execute three-dimensional positioning) in addition to a function to be capable of detecting inclination and an angle described in the first embodiment. Note that the detection unit 25 may be configured to include the GPS function and a known altitude measuring device.

Further, a second acquisition unit 14B further acquires the second absolute position indicating the current latitude, longitude, and altitude of the display unit 20 from the detection unit 25 at the time of acquiring the posture information of the display unit 20 from the detection unit 25.

Then, the calculation unit 14D may calculate the second relative position of the light source L by using the first relative position, first posture information, second posture information, and second absolute position indicating the latitude, longitude, and altitude of the display unit 20.

More specifically, the calculation unit 14D calculates a moving vector amount β of the display unit 20 in a two-dimensional space specified by the latitude/longitude from a difference between the second absolute position at the time of acquiring the first posture information and the second absolute position at the time of acquiring the second posture information. Then, the calculation unit 14D converts the moving vector amount to a vector α having 1-cm unit usable on a ZX plane illustrated in FIG. 2.

Further, same as the first embodiment, the calculation unit 14D calculates a position (defined as a first position γ) obtained by rotating the first relative position by an angle corresponding to a difference of each of rotation angles (yaw angle θ, roll angle ρ, pitch angle φ) between the calculated first posture information and second posture information.

Then, the calculation unit 14D further calculates a position (defined as a second position V) obtained by adding, to the first position γ, the vector α rotated by an angle −θn (yaw angle θn of the display unit 20 specified by the second posture information (refer to FIG. 13)).

Further, the calculation unit 14D calculates an altitude difference δ from a difference between the second absolute position at the time of acquiring the first posture information and the second absolute position at the time of acquiring the second posture information. Then, the calculation unit 14D calculates, as the second relative position, a position obtained by subtracting the altitude difference δ from a Y-coordinate of the calculated second position V (position in Y-axis direction).

Thus, the calculation unit 14D can calculate the second relative position with higher accuracy by calculating the second relative position by using the second absolute position, first relative position, first posture information, and second posture information, compared to the case of not using the second absolute position.

Therefore, according to the display processing apparatus 10 of the present embodiment, there is an additional advantageous effect that a preview image 34 in accordance with the current posture of the display unit 20 can be provided with higher accuracy in addition to advantageous effects of the first embodiment and a third embodiment.

Fifth Embodiment

Meanwhile, at least a part of processing executed at display processing apparatuses 10, 10A according to above-described embodiments may be performed in one or more devices on a cloud connected to the display processing apparatuses 10, 10A, a network, and so on.

Figure 24:
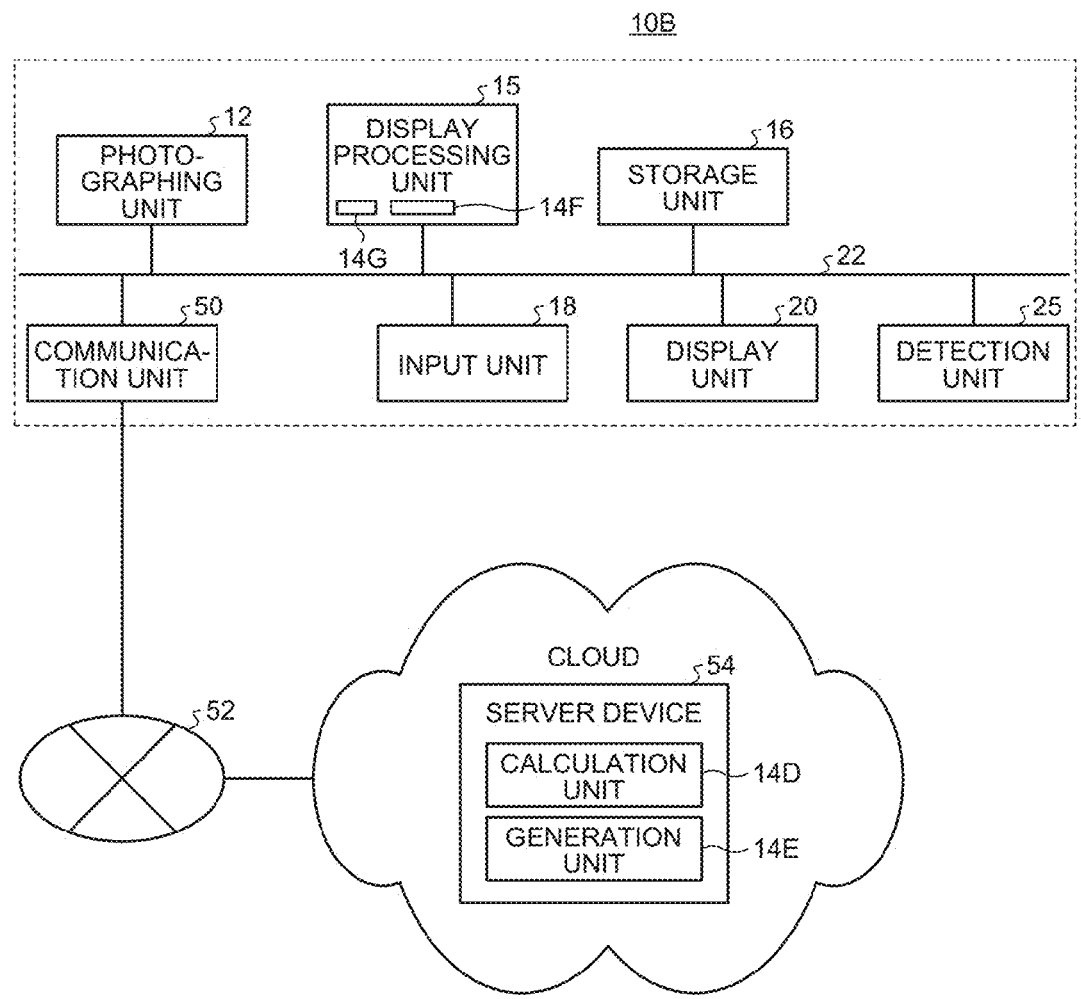
FIG. 24 is a schematic diagram illustrating an exemplary display processing system.

FIG. 24 is a schematic diagram illustrating an exemplary display processing system including the cloud.

As illustrated in FIG. 24, the display processing system has a configuration in which a display processing apparatus 10B and a server device 54 are connected via a network 52.

The display processing apparatus 10B includes a photographing unit 12, a display processing unit 15, a storage unit 16, an input unit 18, a display unit 20, a detection unit 25, and a communication unit 50. The photographing unit 12, display processing unit 15, storage unit 16, input unit 18, display unit 20, detection unit 25, and communication unit 50 are connected via a bus 22. Note that the photographing unit 12, storage unit 16, input unit 18, display unit 20, and detection unit 25 are same as the above-described embodiments.

The display processing unit 15 includes an acquisition unit 14G (first acquisition unit 14A, second acquisition unit 14B, third acquisition unit 14C), and a display control unit 14F. The display processing unit 15 has the configuration same as the above-described embodiments except for not including a calculation unit 14D and a generation unit 14E.

The server device 54 is a device positioned on the cloud. The server device 54 includes the calculation unit 14D and the generation unit 14E described above. These respective units have functions same as the above-described embodiments.

Note that a different point from the above-described embodiments is that information acquired at the acquisition unit 14G is transmitted to the server device 54 as needed, the processing in the calculation unit 14D and the generation unit 14E is executed on the server device 54, and various kinds of information generated are transmitted from the server device 54 to the display processing apparatus 10B. Further, the display control unit 14F of the display processing unit 15 in the display processing apparatus 10B generates a preview image, and controls display based on the various kinds of information acquired from the server device 54.

Note that the processing executed by the server device 54 is not limited to the present example, and the server device 54 can execute a part of the processing executed by a display processing system according to the present embodiment.

Further, the image forming system may also include two or more server devices. In this case, a part of the processing executed by the image forming system according to the embodiment may be decentralized to the respective server devices. Further, the processing to be decentralized to the respective servers can be optionally set.

Sixth Embodiment

Next, display processing apparatuses 10, 10A, 10B described above and a hardware configuration of a server device 54 will be described.

Figure 25:
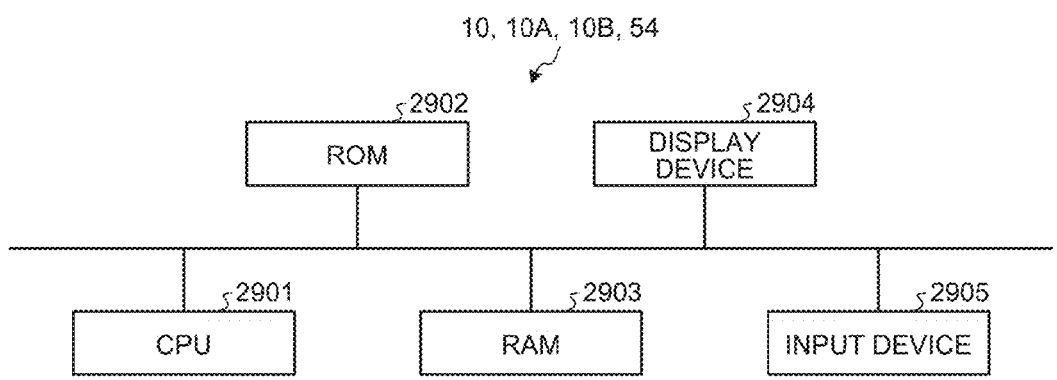
FIG. 25 is a hardware configuration diagram illustrating the display processing apparatus and a server device.

FIG. 25 is a hardware configuration diagram of the display processing apparatuses 10, 10A, 10B and the server device 54. The display processing apparatuses 10, 10A, 10B, and the server device 54 mainly includes, as the hardware configuration, a CPU 2901 to control an entire device, a ROM 2902 to store various kinds of data and various kinds of programs, a RAM 2903 to store various kinds of data and various kinds of programs, an input device 2905 such as a keyboard and a mouse, and a display device 2904 such as a display apparatus, and has the hardware configuration utilizing a standard computer. Note that the input device 2905 corresponds to an input unit 18 in FIG. 1, and the display device 2904 corresponds to a display unit 20 in FIG. 1.

A program executed at the display processing apparatuses 10, 10A, 10B, and the server device 54 according to the above-described embodiments is provided as a computer program product recorded in an installable form or in an executable file form in a computer-readable recording medium such as a CD-ROM, a flexible disk (FD), a CD-R, and a digital versatile disk (DVD).

Further, the program executed at the display processing apparatuses 10, 10A, 10B, and the server device 54 according to the above-described embodiments may be stored on a computer connected to a network such as the Internet so that the program can be provided by being downloaded via the network. Further, the program executed at the display processing apparatuses 10, 10A, 10B, and the server device 54 according to the above-described embodiments may also be provided or distributed via the network such as the Internet.

Furthermore, the program executed at the display processing apparatuses 10, 10A, 10B, and the server device 54 according to the above-described embodiments may also be provided by being preliminarily built into the ROM or the like.

The program executed at the display processing apparatuses 10, 10A, 10B, and the server device 54 according to the above-described embodiments may have a modular configuration including the above-described respective units, and as the actual hardware, respective units are loaded on a main storage device by the CPU (processor) reading and executing the program from the above-mentioned storage medium so as to generate the respective units on the main storage device.

According to the present invention, there is an advantageous effect that a preview image in accordance with a posture of the display unit can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus, comprising:
 a first acquisition unit configured to acquire light source information including a first relative position of a light source with respect to a display unit;
 a detection unit configured to detect posture information of the display unit;
 a second acquisition unit configured to acquire the posture information of the display unit from the detection unit;
 a third acquisition unit configured to acquire document data;
 a calculation unit configured to calculate a second relative position of the light source with respect to the display unit having posture specified by second posture information by using the first relative position, first posture information previously acquired as the posture information, and the second posture information acquired this time as the posture information;
 a generation unit configured to generate a document display surface where a state in which a document surface displaying the document data is disposed in a virtual three-dimensional space and also the light source is disposed at the second relative position with respect to the document surface is converted to a two-dimensional image visually confirmed from a viewpoint position located in a normal line of the document surface; and
 a display control unit configured to execute control to display a superimposed image on the display unit as a preview image estimating a printing result of the document data, the superimposed image being obtained by superimposing a background image of observation environment in a real space and the document display surface.

2. The display processing apparatus according to claim 1, wherein the generation unit generates the document display surface by reflecting, on the document surface, a light source image in which reflectance according to the light source positioned at the second relative position is set for each pixel.

3. The display processing apparatus according to claim 1, wherein
 the second acquisition unit acquires the posture information from the detection unit at predetermined time intervals,
 the calculation unit calculates the second relative position every time the posture information is acquired,
 the generation unit generates the document display surface every time the second relative position is calculated, and the display control unit executes control to display the superimposed image on the display unit as the preview image every time the document display surface is generated.

4. The display processing apparatus according to claim 1, wherein
the first acquisition unit acquires the light source information including a light source type of the light source and the first relative position, and
the generation unit generates the document display surface in which the light source image is reflected on the document surface, and a light amount according to the light source type and reflectance according to the light source positioned at the second relative position are set for each pixel in the light source image.

5. The display processing apparatus according to claim 1, wherein
the first acquisition unit further acquires a paper type indicating paper quality of a recording medium for an image forming object, and
the generation unit generates the document display surface in which the light source image is reflected on the document surface, and reflectance according to the paper type and also according to the light source positioned at the second relative position is set for each pixel in the light source image.

6. The display processing apparatus according to claim 1, wherein the first acquisition unit further acquires the background image photographed by a photographing unit.

7. The display processing apparatus according to claim 1, wherein
the second acquisition unit further acquires a first absolute position indicating latitude and longitude of the display unit from the detection unit, and
the calculation unit calculates the second relative position by using the first absolute position, the first relative position, the first posture information, and the second posture information.

8. The display processing apparatus according to claim 1, wherein
the second acquisition unit further acquires a second absolute position indicating latitude, longitude, and altitude of the display unit from the detection unit, and
the calculation unit calculates the second relative position by using the second absolute position, the first relative position, the first posture information, and the second posture information.

9. The display processing apparatus according to claim 1, wherein the display control unit executes control to display, on the display unit, the preview image in which the background image and the document display surface are disposed in a three-dimensional space.

10. A display processing method comprising:
acquiring light source information including a first relative position of a light source with respect to a display unit;
detecting posture information of the display unit;
acquiring the posture information of the display unit at the detecting;
acquiring document data;
calculating a second relative position of the light source with respect to the display unit having posture specified by second posture information by using the first relative position, first posture information previously acquired as the posture information, and the second posture information acquired this time as the posture information;
generating a document display surface where a state in which a document surface displaying the document data is disposed in a virtual three-dimensional space and also the light source is disposed at the second relative position with respect to the document surface is converted to a two-dimensional image visually confirmed from a viewpoint position located in a normal line of the document surface; and
executing control to display a superimposed image on the display unit as a preview image estimating a printing result of the document data, the superimposed image being obtained by superimposing a background image of observation environment in a real space and the document display surface.

11. A non-transitory computer-readable recording medium that stores therein a computer program causing a computer to execute a display processing method, the method comprising:
acquiring light source information including a first relative position of a light source with respect to a display unit;
detecting posture information of the display unit;
acquiring the posture information of the display unit at the detecting;
acquiring document data;
calculating a second relative position of the light source with respect to the display unit having posture specified by second posture information by using the first relative position, first posture information previously acquired as the posture information, and the second posture information acquired this time as the posture information;
generating a document display surface where a state in which a document surface displaying the document data is disposed in a virtual three-dimensional space and also the light source is disposed at the second relative position with respect to the document surface is converted to a two-dimensional image visually confirmed from a viewpoint position located in a normal line of the document surface; and
executing control to display a superimposed image on the display unit as a preview image estimating a printing result of the document data, the superimposed image being obtained by superimposing a background image of observation environment in a real space and the document display surface.

* * * * *